US012136153B2

(12) United States Patent
Luo et al.

(10) Patent No.: US 12,136,153 B2
(45) Date of Patent: Nov. 5, 2024

(54) MESSAGING SYSTEM WITH AUGMENTED REALITY MAKEUP

(71) Applicant: Snap Inc., Santa Monica, CA (US)

(72) Inventors: Jean Luo, Seattle, WA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/099,148

(22) Filed: Jan. 19, 2023

(65) Prior Publication Data

US 2023/0154084 A1 May 18, 2023

Related U.S. Application Data

(63) Continuation of application No. 17/304,978, filed on Jun. 29, 2021, now Pat. No. 11,580,682.

(Continued)

(51) Int. Cl.
*G06T 11/00* (2006.01)
*G06F 18/20* (2023.01)
(Continued)

(52) U.S. Cl.
CPC ............ *G06T 11/60* (2013.01); *G06F 18/214* (2023.01); *G06F 18/285* (2023.01); *G06N 3/045* (2023.01);
(Continued)

(58) Field of Classification Search
None
See application file for complete search history.

(56) References Cited

U.S. PATENT DOCUMENTS 5,754,939 A    5/1998   Herz et al.
5,880,731 A    3/1999   Liles et al.
(Continued)

FOREIGN PATENT DOCUMENTS

CA        2887596 A1    7/2015
CN    109863532 A    6/2019
(Continued)

OTHER PUBLICATIONS

"U.S. Appl. No. 17/304,978, Notice of Allowance mailed Oct. 20, 2022", 9 pgs.

(Continued)

*Primary Examiner* — Martin Mushambo
(74) *Attorney, Agent, or Firm* — Schwegman Lundberg & Woessner, P.A.

(57) ABSTRACT

Systems, methods, and computer readable media for messaging system with augmented reality (AR) makeup are presented. Methods include processing a first image to extract a makeup portion of the first image, the makeup portion representing the makeup from the first image and training a neural network to process images of people to add AR makeup representing the makeup from the first image. The methods may further include receiving, via a messaging application implemented by one or more processors of a user device, input that indicates a selection to add the AR makeup to a second image of a second person. The methods may further include processing the second image with the neural network to add the AR makeup to the second image and causing the second image with the AR makeup to be displayed on a display device of the user device.

19 Claims, 20 Drawing Sheets

Related U.S. Application Data

(60) Provisional application No. 63/046,236, filed on Jun. 30, 2020.

(51) Int. Cl.
  *G06F 18/214* (2023.01)
  *G06N 3/045* (2023.01)
  *G06N 3/08* (2023.01)
  *G06T 11/60* (2006.01)
  *G06V 40/10* (2022.01)
  *H04L 51/18* (2022.01)
  *G06F 3/0482* (2013.01)

(52) U.S. Cl.
  CPC ............... *G06N 3/08* (2013.01); *G06V 40/10* (2022.01); *H04L 51/18* (2013.01); *G06F 3/0482* (2013.01); *G06T 2200/24* (2013.01)

(56) References Cited

U.S. PATENT DOCUMENTS

| | | | |
|---|---|---|---|
| 6,023,270 A | 2/2000 | Brush, II et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,223,165 B1 | 4/2001 | Lauffer |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,580,812 B1 | 6/2003 | Harrington |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,772,195 B1 | 8/2004 | Hatlelid et al. |
| 6,842,779 B1 | 1/2005 | Nishizawa |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,342,587 B2 | 3/2008 | Danzig et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,468,729 B1 | 12/2008 | Levinson |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,636,755 B2 | 12/2009 | Blattner et al. |
| 7,639,251 B2 | 12/2009 | Gu et al. |
| 7,703,140 B2 | 4/2010 | Nath et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,570,907 B2 | 10/2013 | Garcia, Jr. et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,745,132 B2 | 6/2014 | Obradovich |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,256,860 B2 | 2/2016 | Herger et al. |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,443,227 B2 | 9/2016 | Evans et al. |
| 9,460,541 B2 | 10/2016 | Li et al. |
| 9,482,882 B1 | 11/2016 | Hanover et al. |

(56) References Cited

U.S. PATENT DOCUMENTS

| | | |
|---|---|---|
| 9,482,883 B1 | 11/2016 | Meisenholder |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,785,796 B1 | 10/2017 | Murphy et al. |
| 9,792,714 B2 | 10/2017 | Li et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,324,739 B2 | 6/2019 | Chou et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,552,977 B1 * | 2/2020 | Theis .................. G06T 7/70 |
| 10,553,006 B2 | 2/2020 | Iglehart et al. |
| 10,573,048 B2 | 2/2020 | Ni et al. |
| 10,657,701 B2 | 5/2020 | Osman et al. |
| 10,885,697 B1 * | 1/2021 | Viswanathan .......... G06T 7/44 |
| 11,290,687 B1 | 3/2022 | Becchetti |
| 11,423,652 B2 | 8/2022 | Barron et al. |
| 11,464,319 B2 | 10/2022 | Barron et al. |
| 11,580,682 B1 | 2/2023 | Luo et al. |
| 11,676,354 B2 | 6/2023 | Barron et al. |
| 2002/0047868 A1 | 4/2002 | Miyazawa |
| 2002/0067362 A1 | 6/2002 | Agostino Nocera et al. |
| 2002/0144154 A1 | 10/2002 | Tomkow |
| 2002/0169644 A1 | 11/2002 | Greene |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0162419 A1 | 7/2005 | Kim et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2006/0294465 A1 | 12/2006 | Ronen et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0158222 A1 | 7/2008 | Li et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0016617 A1 | 1/2009 | Bregman-Amitai et al. |
| 2009/0042588 A1 | 2/2009 | Lottin et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0132453 A1 | 5/2009 | Hangartner et al. |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0082427 A1 | 4/2010 | Burgener et al. |
| 2010/0115426 A1 | 5/2010 | Liu et al. |
| 2010/0131880 A1 | 5/2010 | Lee et al. |
| 2010/0162149 A1 | 6/2010 | Sheleheda et al. |
| 2010/0185665 A1 | 7/2010 | Horn et al. |
| 2010/0203968 A1 | 8/2010 | Gill et al. |
| 2010/0227682 A1 | 9/2010 | Reville et al. |
| 2010/0306669 A1 | 12/2010 | Della Pasqua |
| 2011/0093780 A1 | 4/2011 | Dunn |
| 2011/0099507 A1 | 4/2011 | Nesladek et al. |
| 2011/0115798 A1 | 5/2011 | Nayar et al. |
| 2011/0123068 A1 | 5/2011 | Miksa et al. |
| 2011/0145564 A1 | 6/2011 | Moshir et al. |
| 2011/0148864 A1 | 6/2011 | Lee et al. |
| 2011/0202598 A1 | 8/2011 | Evans et al. |
| 2011/0213845 A1 | 9/2011 | Logan et al. |
| 2011/0239136 A1 | 9/2011 | Goldman et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0028706 A1 | 2/2012 | Raitt et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0257000 A1 * | 10/2012 | Singhal .................. H04N 7/183 348/14.02 |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0103760 A1 | 4/2013 | Golding et al. |
| 2013/0194301 A1 | 8/2013 | Robbins et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0258118 A1 * | 10/2013 | Felt .................. H04N 9/643 348/207.1 |
| 2013/0290443 A1 | 10/2013 | Collins et al. |
| 2014/0032682 A1 | 1/2014 | Prado et al. |
| 2014/0043329 A1 | 2/2014 | Wang et al. |
| 2014/0055554 A1 | 2/2014 | Du et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0201527 A1 | 7/2014 | Krivorot |

(56) References Cited

U.S. PATENT DOCUMENTS

| | | | |
|---|---|---|---|
| 2014/0210814 A1* | 7/2014 | Kim | A45D 44/005 345/629 |
| 2014/0282096 A1 | 9/2014 | Rubinstein et al. | |
| 2014/0325383 A1 | 10/2014 | Brown et al. | |
| 2014/0359024 A1 | 12/2014 | Spiegel | |
| 2014/0359032 A1 | 12/2014 | Spiegel et al. | |
| 2015/0199082 A1 | 7/2015 | Scholler et al. | |
| 2015/0206349 A1 | 7/2015 | Rosenthal et al. | |
| 2015/0227602 A1 | 8/2015 | Ramu et al. | |
| 2015/0365627 A1 | 12/2015 | Deng et al. | |
| 2015/0366328 A1* | 12/2015 | Tamura | G06T 11/00 434/100 |
| 2016/0000209 A1* | 1/2016 | Yamanashi | G06T 11/00 600/300 |
| 2016/0015152 A1* | 1/2016 | Ajiki | G06V 40/172 132/200 |
| 2016/0022014 A1* | 1/2016 | Ajiki | G06V 40/171 132/320 |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0134840 A1 | 5/2016 | Mcculloch | |
| 2016/0180887 A1 | 6/2016 | Sehn | |
| 2016/0234149 A1 | 8/2016 | Tsuda et al. | |
| 2016/0277419 A1 | 9/2016 | Allen et al. | |
| 2016/0321708 A1 | 11/2016 | Sehn | |
| 2016/0359957 A1 | 12/2016 | Laliberte | |
| 2016/0359987 A1 | 12/2016 | Laliberte | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0161382 A1 | 6/2017 | Ouimet et al. | |
| 2017/0199855 A1 | 7/2017 | Fishbeck | |
| 2017/0235848 A1 | 8/2017 | Van Dusen et al. | |
| 2017/0263029 A1 | 9/2017 | Yan et al. | |
| 2017/0287006 A1 | 10/2017 | Azmoodeh et al. | |
| 2017/0295250 A1 | 10/2017 | Samaranayake et al. | |
| 2017/0310934 A1 | 10/2017 | Du et al. | |
| 2017/0312634 A1 | 11/2017 | Ledoux et al. | |
| 2017/0374003 A1 | 12/2017 | Allen et al. | |
| 2017/0374508 A1 | 12/2017 | Davis et al. | |
| 2018/0047200 A1 | 2/2018 | O'Hara et al. | |
| 2018/0075523 A1 | 3/2018 | Sartori Odizzio et al. | |
| 2018/0075524 A1 | 3/2018 | Sartori Odizzio et al. | |
| 2018/0113587 A1 | 4/2018 | Allen et al. | |
| 2018/0115503 A1 | 4/2018 | Baldwin et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0014884 A1 | 1/2019 | Fu et al. | |
| 2019/0057616 A1 | 2/2019 | Cohen et al. | |
| 2019/0130253 A1* | 5/2019 | Schultz | G06N 3/045 |
| 2019/0188920 A1 | 6/2019 | Mcphee et al. | |
| 2019/0197736 A1* | 6/2019 | Sugaya | G06V 40/161 |
| 2019/0212828 A1 | 7/2019 | Kin et al. | |
| 2019/0289986 A1 | 9/2019 | Fu et al. | |
| 2019/0325200 A1* | 10/2019 | Qian | G06V 40/171 |
| 2019/0325616 A1* | 10/2019 | Chhaya | G06V 40/167 |
| 2020/0022478 A1 | 1/2020 | Kelley et al. | |
| 2020/0051298 A1* | 2/2020 | Nguyen | G06T 1/00 |
| 2020/0082158 A1* | 3/2020 | Hussain | G06T 7/11 |
| 2020/0117348 A1* | 4/2020 | Jang | G06F 3/0482 |
| 2020/0118689 A1 | 4/2020 | Luthy et al. | |
| 2020/0160153 A1* | 5/2020 | Elmoznino | G06N 3/08 |
| 2020/0175275 A1 | 6/2020 | Oser | |
| 2020/0305579 A1 | 10/2020 | Yang et al. | |
| 2020/0320769 A1* | 10/2020 | Chen | G06F 18/214 |
| 2020/0342630 A1* | 10/2020 | Elmoznino | G06T 11/001 |
| 2021/0015242 A1* | 1/2021 | Jhou | G06Q 30/0643 |
| 2021/0019541 A1* | 1/2021 | Wang | G06V 40/172 |
| 2021/0219700 A1* | 7/2021 | Mauger | G06T 11/001 |
| 2021/0259517 A1 | 8/2021 | Ubbesen | |
| 2021/0298458 A1 | 9/2021 | Barron et al. | |
| 2021/0304517 A1 | 9/2021 | Barron et al. | |
| 2021/0304629 A1* | 9/2021 | Barron | G06V 20/20 |
| 2021/0345016 A1 | 11/2021 | Nakano et al. | |
| 2021/0357627 A1* | 11/2021 | Kim | G06T 11/206 |
| 2021/0358181 A1 | 11/2021 | Suzuki et al. | |
| 2021/0383460 A1 | 12/2021 | Sartori Odizzio et al. | |
| 2021/0390311 A1 | 12/2021 | Barron et al. | |
| 2022/0150287 A1 | 5/2022 | Kasaba | |
| 2023/0050788 A1 | 2/2023 | Barron et al. | |
| 2023/0108804 A1 | 4/2023 | Barron et al. | |

FOREIGN PATENT DOCUMENTS

| | | |
|---|---|---|
| CN | 110168478 A | 8/2019 |
| CN | 115699130 A | 2/2023 |
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012000107 A1 | 1/2012 |
| WO | WO-2012139276 A1 | 10/2012 |
| WO | WO-2013008251 A2 | 1/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194262 A2 | 12/2014 |
| WO | WO-2014194439 A1 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016090605 A1 | 6/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2021203120 A1 | 10/2021 |

OTHER PUBLICATIONS

"[YouCam Makeup] AI Look Transfer", YouCam Makeup: Selfie Makeovers App, Retrieved from the Internet: <URL:https://www.youtube.com/watch?v=wKKDtQOOuks> [retrieved on Jun. 30, 2021], (Nov. 10, 2017).

"U.S. Appl. No. 17/155,715, Notice of Allowance mailed Apr. 13, 2022", 10 pgs.

"U.S. Appl. No. 17/215,697, Examiner Interview Summary mailed Dec. 6, 2022", 2 pgs.

"U.S. Appl. No. 17/215,697, Final Office Action mailed May 12, 2022", 20 pgs.

"U.S. Appl. No. 17/215,697, Non Final Office Action mailed Sep. 6, 2022", 21 pgs.

"U.S. Appl. No. 17/215,697, Non Final Office Action mailed Nov. 1, 2021", 17 pgs.

"U.S. Appl. No. 17/215,697, Notice of Allowance mailed Feb. 1, 2023", 9 pgs.

"U.S. Appl. No. 17/215,697, PTO Response to Rule 312 Communication mailed May 10, 2023", 2 pgs.

"U.S. Appl. No. 17/215,697, Response filed Feb. 1, 2022 to Non Final Office Action mailed Nov. 1, 2021", 8 pgs.

"U.S. Appl. No. 17/215,697, Response filed Aug. 12, 2022 to Final Office Action mailed May 12, 2022", 10 pgs.

"U.S. Appl. No. 17/215,697, Response filed Dec. 2, 2022 to Non Final Office Action mailed Sep. 6, 2022", 10 pgs.

(56) References Cited

OTHER PUBLICATIONS

"U.S. Appl. No. 17/301,090, Corrected Notice of Allowability mailed Jun. 23, 2022", 13 pgs.
"U.S. Appl. No. 17/301,090, Notice of Allowance mailed Jun. 10, 2022", 27 pgs.
"U.S. Appl. No. 17/820,661, Non Final Office Action mailed Mar. 16, 2023", 7 pgs.
"U.S. Appl. No. 17/820,661, Preliminary Amendment filed Nov. 2, 2022", 7 pgs.
"U.S. Appl. No. 17/820,661, Response filed Apr. 26, 2023 to Non Final Office Action mailed Mar. 16, 2023", 8 pgs.
"U.S. Appl. No. 17/938,464, Non Final Office Action mailed Mar. 31, 2023", 9 pgs.
"U.S. Appl. No. 17/938,464, Non Final Office Action mailed Aug. 1, 2023", 11 pgs.
"U.S. Appl. No. 17/938,464, Notice of Allowance mailed Dec. 12, 2023", 18 pgs.
"U.S. Appl. No. 17/938,464, Preliminary Amendment Filed Dec. 22, 2022", 7 pgs.
"U.S. Appl. No. 17/938,464, Response filed May 1, 2023 to Non Final Office Action mailed Mar. 31, 2023", 9 pgs.
"U.S. Appl. No. 17/938,464, Response filed Nov. 1, 2023 to Non Final Office Action mailed Aug. 1, 2023", 8 pgs.
"U.S. Appl. No. 17/215,697, Amendment Under 37 CFR 1.312 Filed May 1, 2023", 6 pgs.
"International Application Serial No. PCT/US2021/070304, International Preliminary Report on Patentability mailed Oct. 13, 2022", 10 pgs.
"International Application Serial No. PCT/US2021/070304, International Search Report mailed Jul. 13, 2021", 4 pages.
"International Application Serial No. PCT/US2021/070304, Written Opinion mailed Jul. 13, 2021", 8 pages.
"YouCam Makeup AI Look Transfer", [Online] Retrieved from the internet: https://www.youtube.com/watch?v=wKKDtQ00uks, (Nov. 9, 2017), 2 pgs.
Anderson, et al., "YouMove: Enhancing Movement Training with an Augmented Reality Mirror", ACM,, (Oct. 11, 2013), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Mohr, et al., "Retargeting Video Tutorials Showing Tools With Surface Contact to Augmented Reality", ACM, (May 11, 2017), 12 pgs.
Oliveira, Almeida Dicksson Rammon, et al., "Interactive Makeup Tutorial Using Face Tracking and Augmented Reality on Mobile Devices", 2015 XVII Symposium on Virtual and Augmented Reality, IEEE, (May 25, 2015), 220-226.
Sawers, Paul, "Snapchat for iOS Lets You Send Photos to Friends and Set How long They're Visible For", [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.

* cited by examiner

MESSAGING SYSTEM WITH AUGMENTED REALITY MAKEUP

CROSS-REFERENCE TO RELATED APPLICATIONS

This application is a continuation of prior application Ser. No. 17/304,978, filed on Jun. 29, 2021, and claims the benefit of priority to U.S. Provisional Application Ser. No. 63/046,236, filed on Jun. 30, 2020, which are incorporated herein by reference in their entirety.

TECHNICAL FIELD

Embodiments of the present disclosure relate generally to processing images to generate augmented reality (AR) makeup within a messaging system. More particularly, but not by way of limitation, embodiments of the present disclosure relate to generating applications that process a first image of a first person with makeup and a second image of a second person without makeup to generate a third image of the second person with AR makeup.

BACKGROUND

The application of beauty products has become more and more expensive and time-consuming. Additionally, applying beauty products may be difficult so that the first application of the beauty product may not produce the desired results. Applying beauty products to achieve a desired makeup look may require hours to learn. A person may view a makeup look and not be able to visualize whether the makeup look will look good on them or not. Moreover, there may be many more images of makeup looks available on the internet than a person could practically apply.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
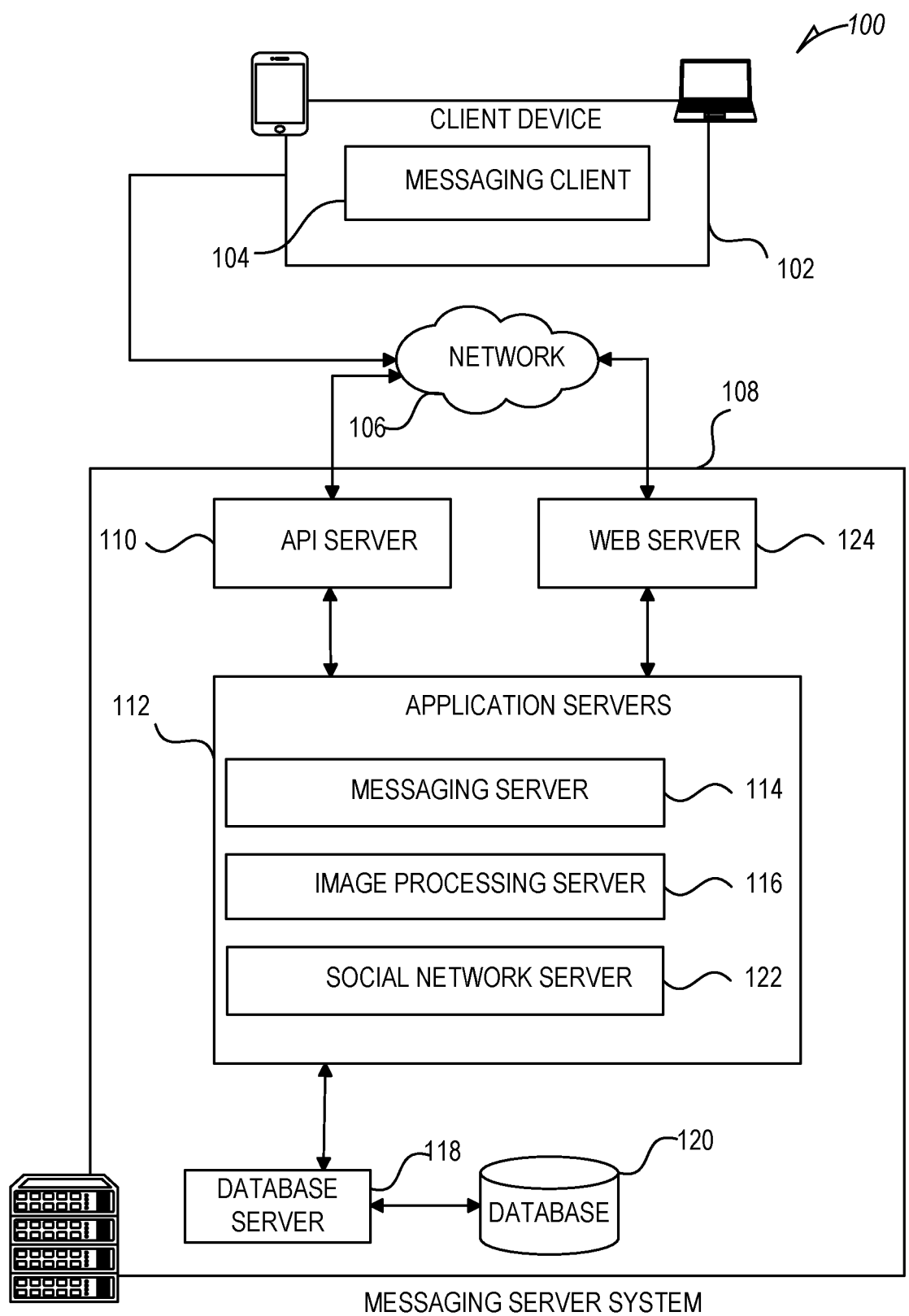
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Disclosed is an AR makeup system that adds AR makeup to an image of a user. A user may select an image of a person with makeup. The AR makeup system takes the image of the person with makeup and generates an application that will add AR makeup to an image of the user to simulate the look of the makeup. The AR makeup system runs on a user device such as a mobile phone and can process live images to add the AR makeup.

The AR makeup system uses two neural networks. A first neural network to segment an image of a person with makeup into makeup segments and not makeup segments or portions. The second neural network is then trained to add AR makeup to an image of a user without makeup to simulate the look of the makeup segments.

The AR makeup system may present a carousel or list of applications where each application will add different AR makeup to an image of the user. The AR makeup system provides a preview of what a person looks like with the makeup so that the user can decide if they want to see what they would look like with the corresponding AR makeup.

A technical problem is how to generate AR makeup to look realistic so that the user may determine how they look with the makeup without training data that includes images of a person with the makeup and images of the same person without the makeup. In some embodiments, the technical problem is how to train a neural network without a ground truth. For example, a user may find a single image of a person with makeup on the internet. There may not be any images of the person without the makeup. In some embodiments, the AR makeup system solves this technical problem by first determining which segments or portions of the image are makeup and which are not makeup. The AR makeup system then uses the segments that are makeup and images of different people without makeup to train the neural network. In some embodiments, the neural network is trained by determining style differences between the segments that are makeup and the images of the different people without makeup with the added AR makeup. The style differences are used with backpropagation to train the neural network. In this way the technical problem is solved in that a neural network may be trained to process images of a user to add AR makeup without having training data of a person with the makeup and images of the same person without the makeup. Additionally, differences between the images of the people without makeup and the images of the people with the added AR makeup are used to train the neural network to reduce distortions to the images of the people. This solves the technical problem of providing a look that is realistic in that distortions are reduced or prevented so that the image is more realistic looking.

In some embodiments, the AR makeup system uses networked computers or backend computer to train the neural networks and then downloads the neural networks or weights to the user device. In some embodiments, the AR makeup system uses geometric techniques to place the makeup segments on the image of the user.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
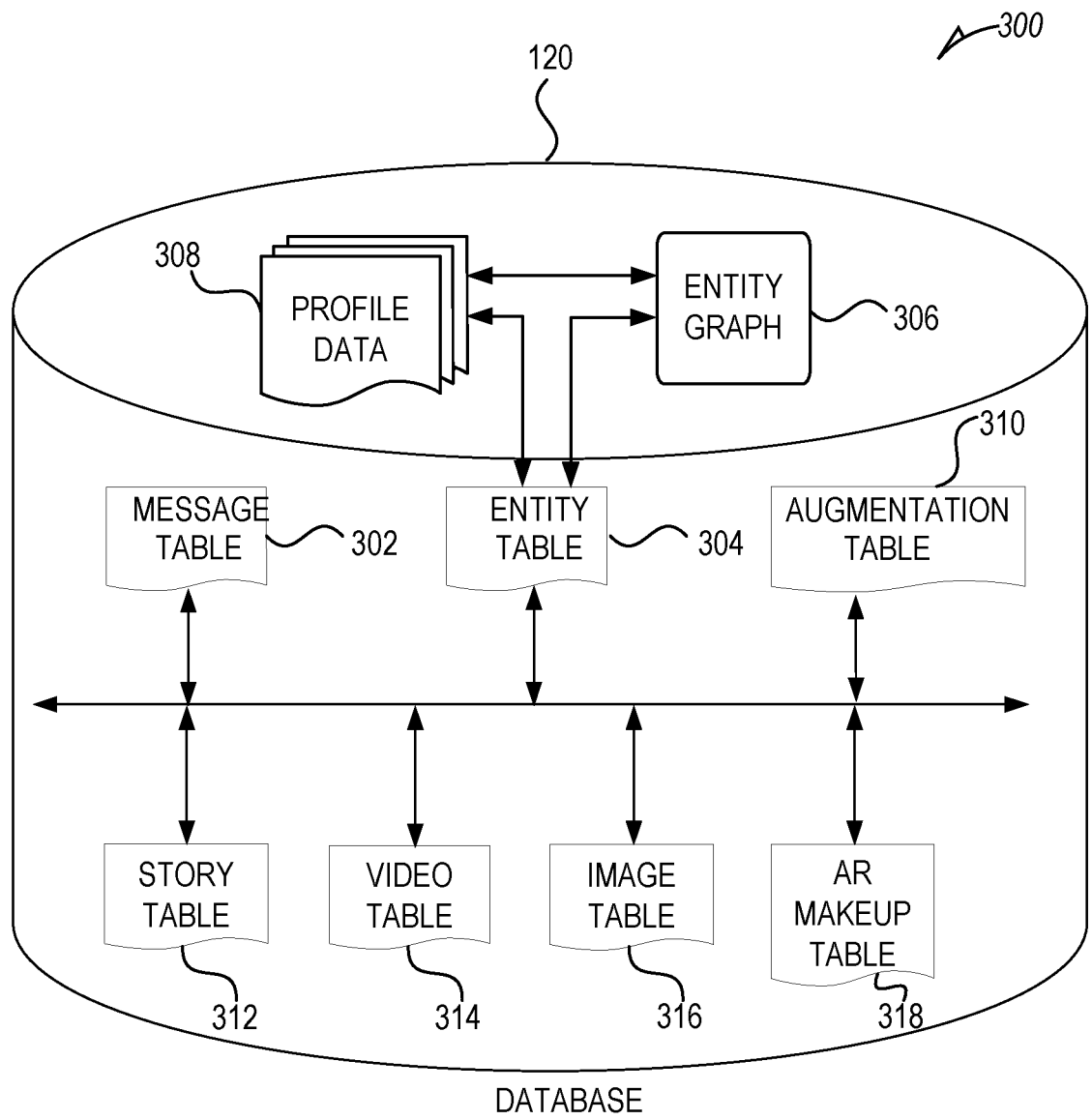
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
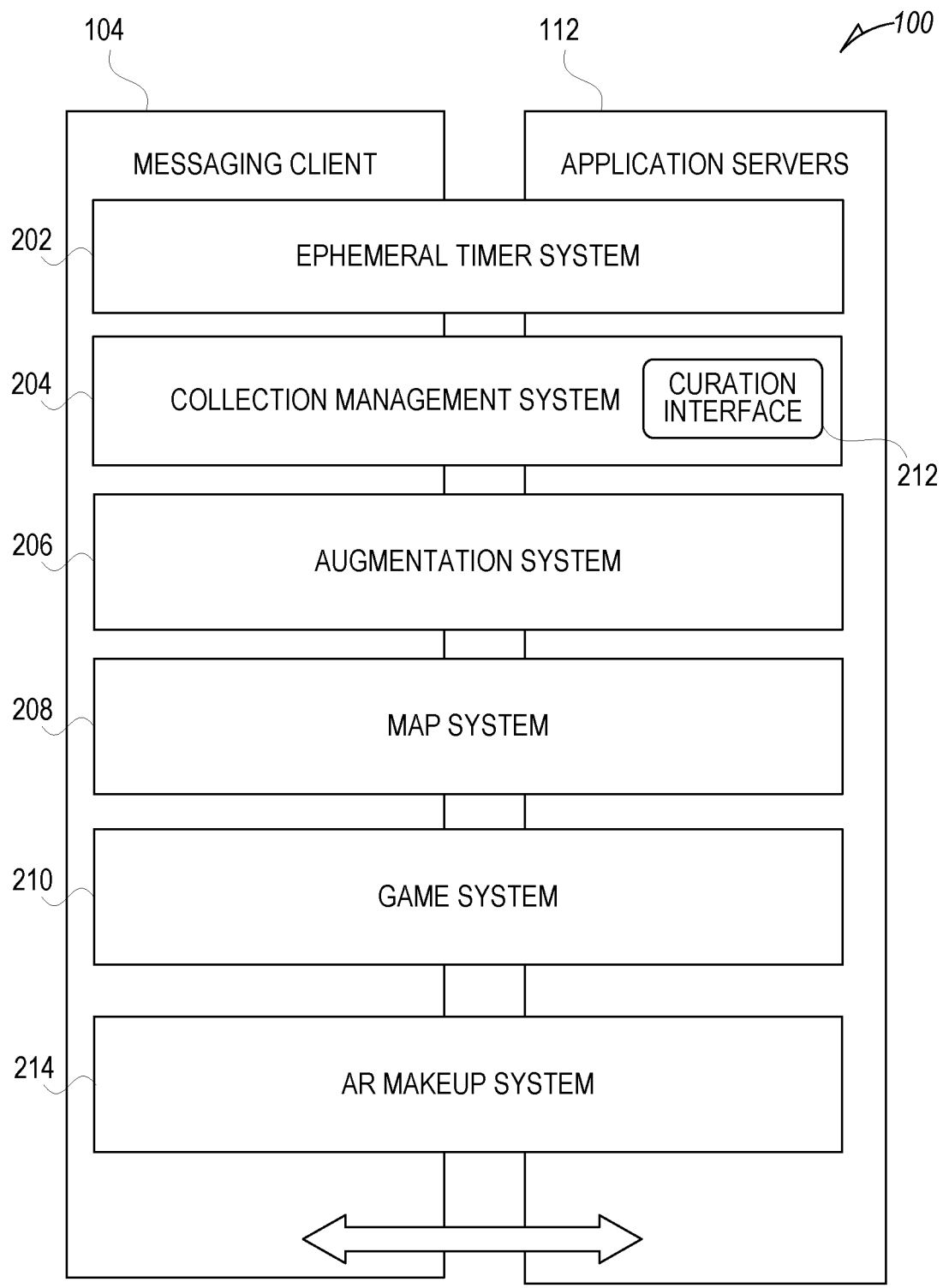
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 206, a map system 208, a game system 210, curation interface 212, and an AR makeup system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The AR makeup system 214 provides various functions related to processing images to add AR makeup to the images. The AR makeup system 214 provides a system that takes a makeup image 602 of FIG. 6 and generates an application, AR makeup module 606, that will take a no makeup image 608 and process the no makeup image 608 to add AR makeup 710 so that the no makeup image 608 has makeup that looks similar to the makeup of the makeup image 602. The AR makeup system 214 provides a system that will train AR makeup module 606 using the makeup image 608 and training data 1502 of no makeup images 608 where the people in the makeup image 602 may be images with different faces 1518 or images of same faces 1516.

Figure 6:
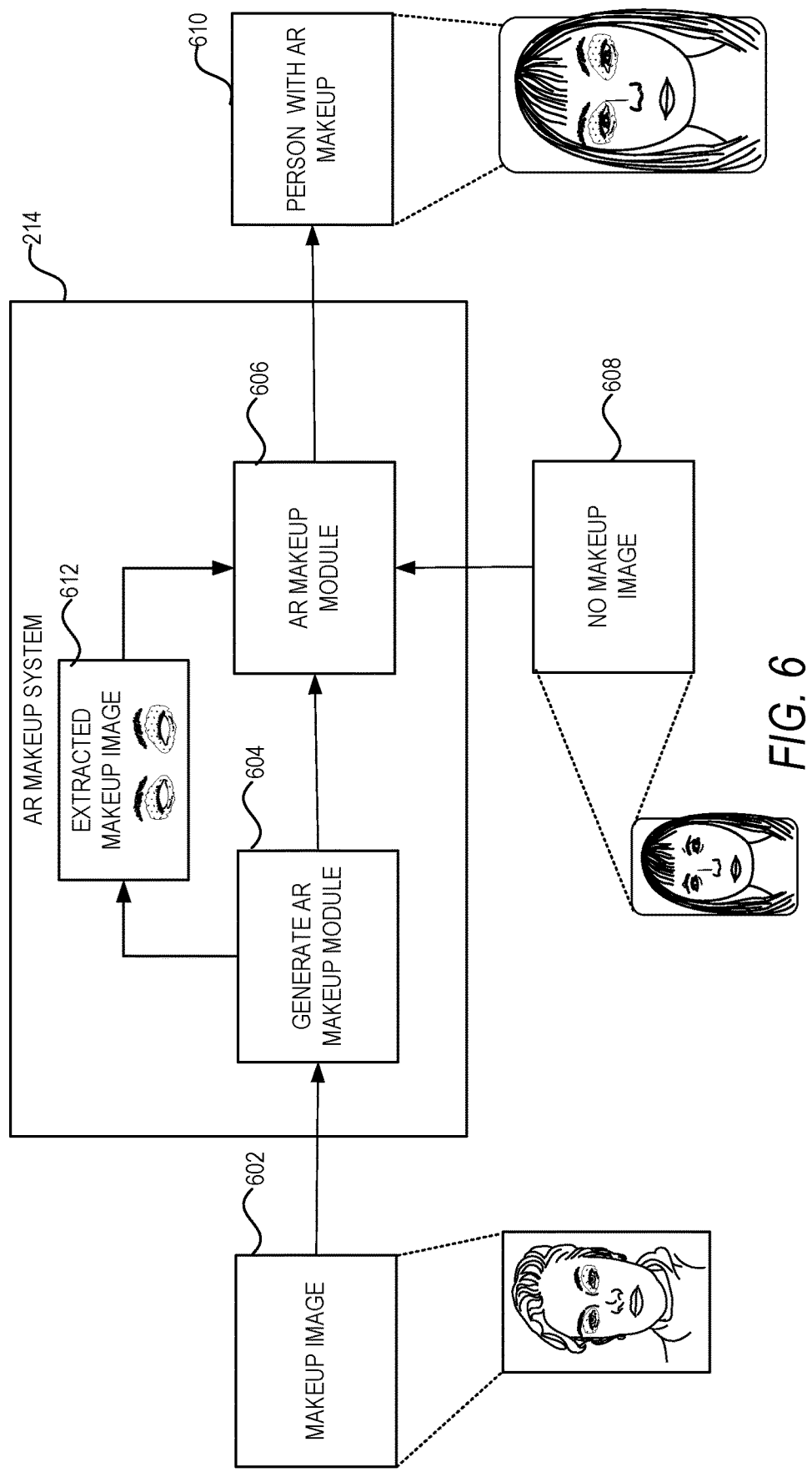
FIG. 6 illustrates an AR makeup system, in accordance with some embodiments.
Figure 9:
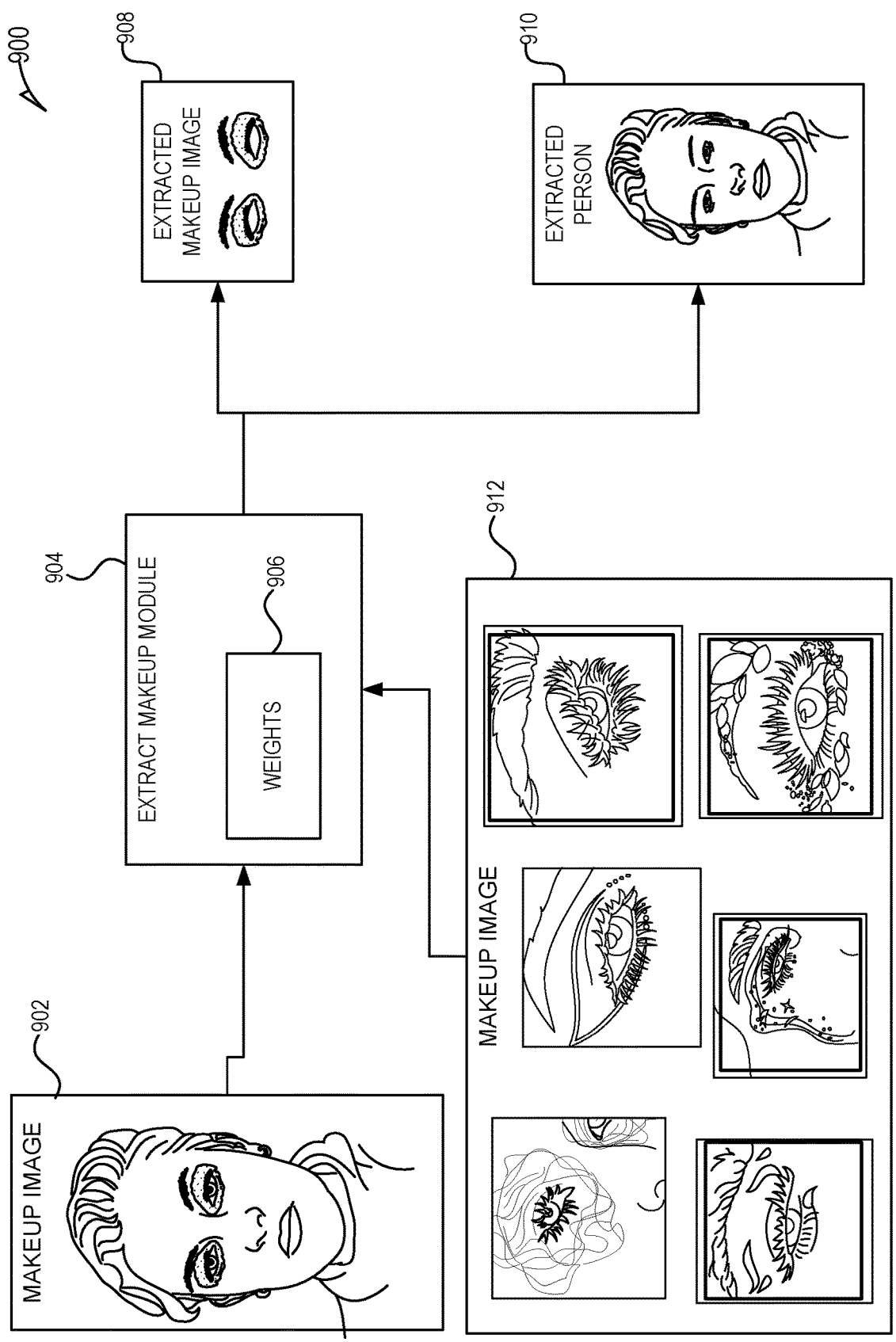
FIG. 9 illustrates an AR makeup system, in accordance with some embodiments.
Figure 10:
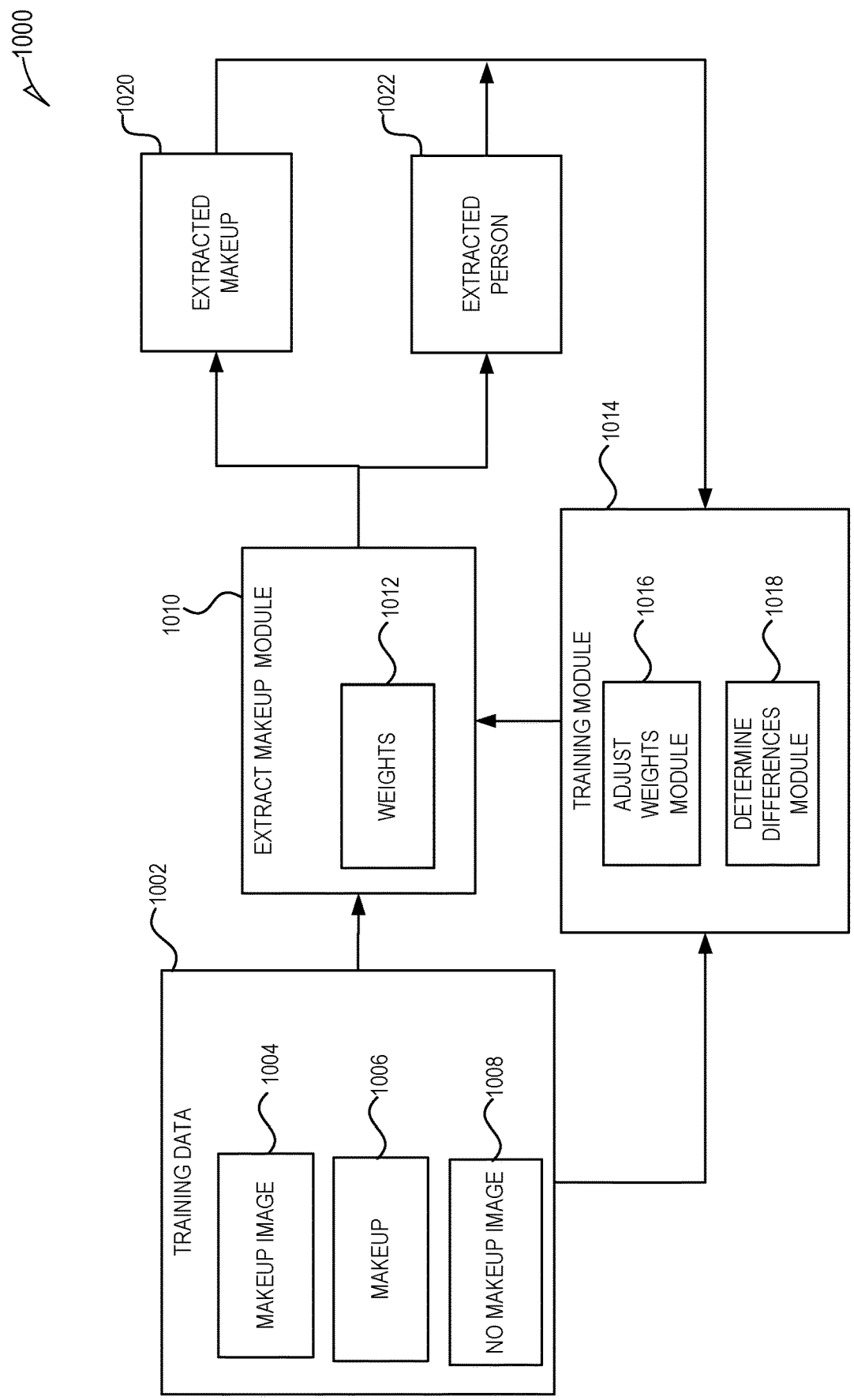
FIG. 10 illustrates an AR makeup system, in accordance with some embodiments.
Figure 15:
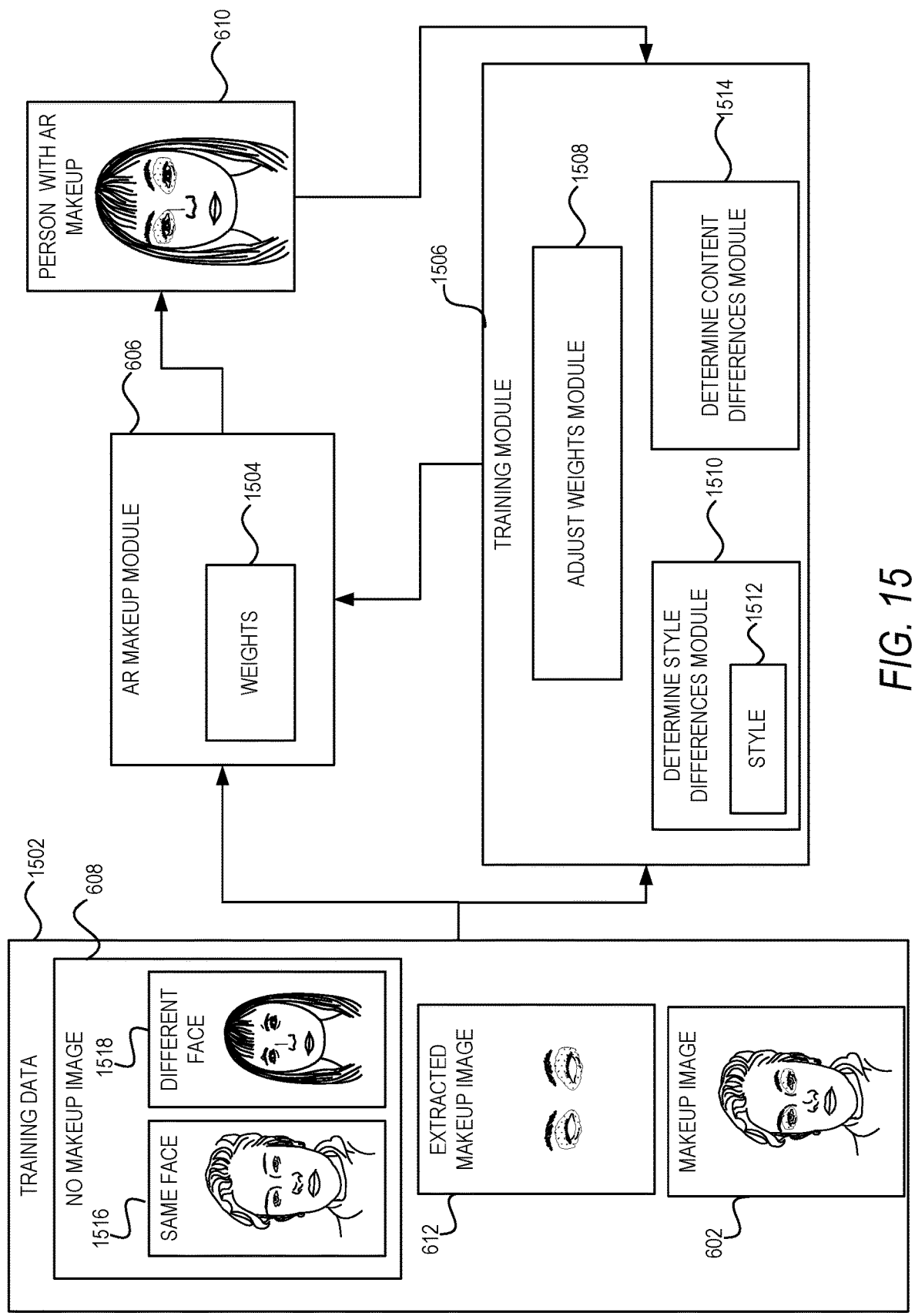
FIG. 15 illustrates the operation of AR makeup module, in accordance with some embodiments.

The AR makeup system 214 may store AR makeup modules 606 of FIG. 6, weights 906 of FIG. 9, weights 1012 of FIG. 10, and training data 1502 of FIG. 15 in AR makeup table 318 of FIG. 3. The AR makeup system 214 may reside on the client device 102 and the messaging server system 108. The AR makeup system 214 accesses a display device of the client device 102 and may access a camera of the client device 102. In some embodiments, the AR makeup system 214 generates or trains the AP makeup module 606 on the messaging server system 108 and then the AR makeup module 606 operates on the client device 102 once the weights 1504 are trained. FIG. 6 provides an overview of the AR makeup system 214 and is discussed below.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database 120 can also store, referring to FIGS. 9, 10, and 15, extract makeup module 904, weights 906, training data 1002, training module 1014, training data 1502, AR makeup module 606, weights 1504, and training module 1506 in AR makeup table 318.

Data Communications Architecture

Figure 4:
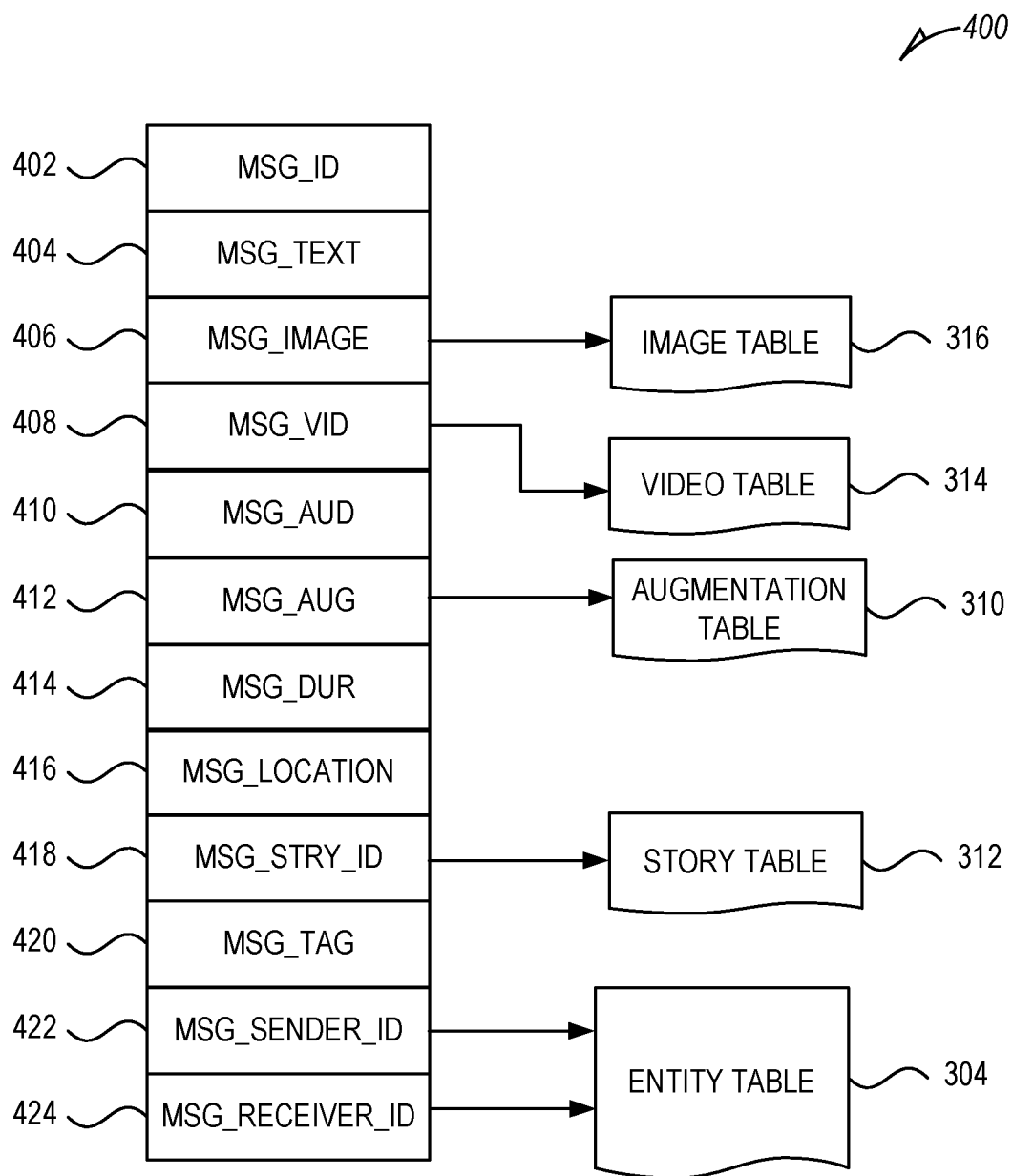
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier (MSG ID) 402: a unique identifier that identifies the message 400. Message text payload (MSG_TEXT) 404: text, to be generated by a user via a user interface of the client device 102, and that is included in the message 400.

Message image payload 406: image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter (MSG_DUR) 414: parameter value indicating, in seconds, the amount of time for which content of the message (e.g., the message image payload 406, message video payload 408, message audio payload 410) is to be presented or made accessible to a user via the messaging client 104.

Message geolocation parameter (MSG_LOCATION) 416: geolocation data (e.g., latitudinal and longitudinal coordinates) associated with the content payload of the message. MSG_LOCATION 416 values may be included in the payload, each of these parameter values being associated with respect to content items included in the content (e.g., a specific image into within the message image payload 406, or a specific video in the message video payload 408).

Message story identifier (MSG_STRY_ID) 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier (MSG_SENDER_ID) 422: an identifier (e.g., a messaging system identifier, email address, or device identifier) indicative of a user of the Client device 102 on which the message 400 was generated and from which the message 400 was sent.

Message receiver identifier (MSG_RECEIVER_ID) 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the MSG_SENDER_ID 422 and the MSG_RECEIVER_ID 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
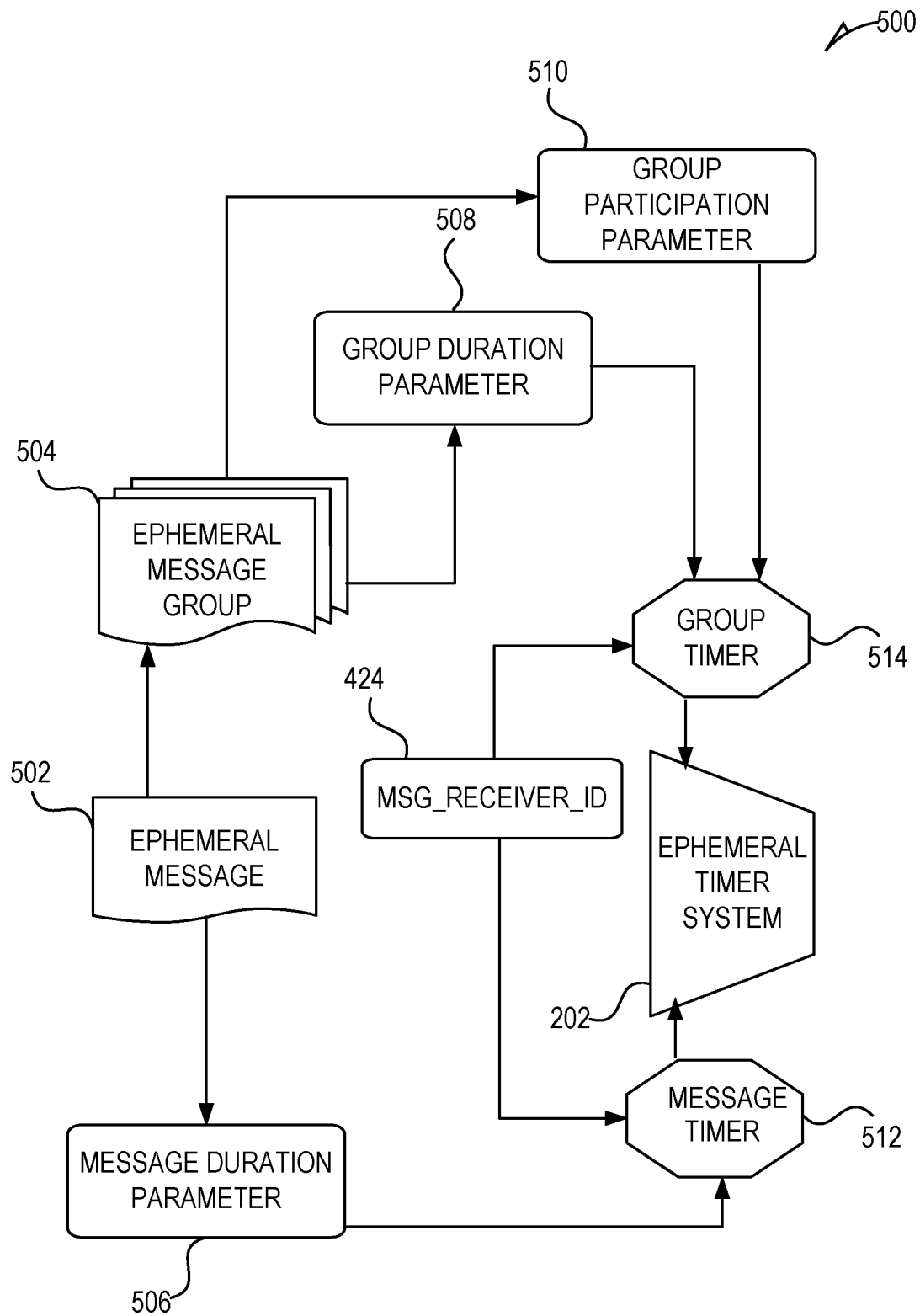
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

AR Makeup System

FIG. 6 illustrates an AR makeup system 214, in accordance with some embodiments. Illustrated in FIG. 6 is makeup image 602, AR makeup system 214, generate AR makeup module 604, AR makeup module 606, no makeup image 608, and person with AR makeup 610.

The makeup image 602 is an image that includes a person and makeup. The no makeup image 608 is an image that includes a person without the makeup of makeup image 602. Person with AR makeup 610 is no makeup image 608 processed by AR makeup system 214 to include AR makeup to look like the extracted makeup image 612 from makeup image 602. The extracted makeup image 612 is the makeup extracted from makeup image 602.

Figure 8:
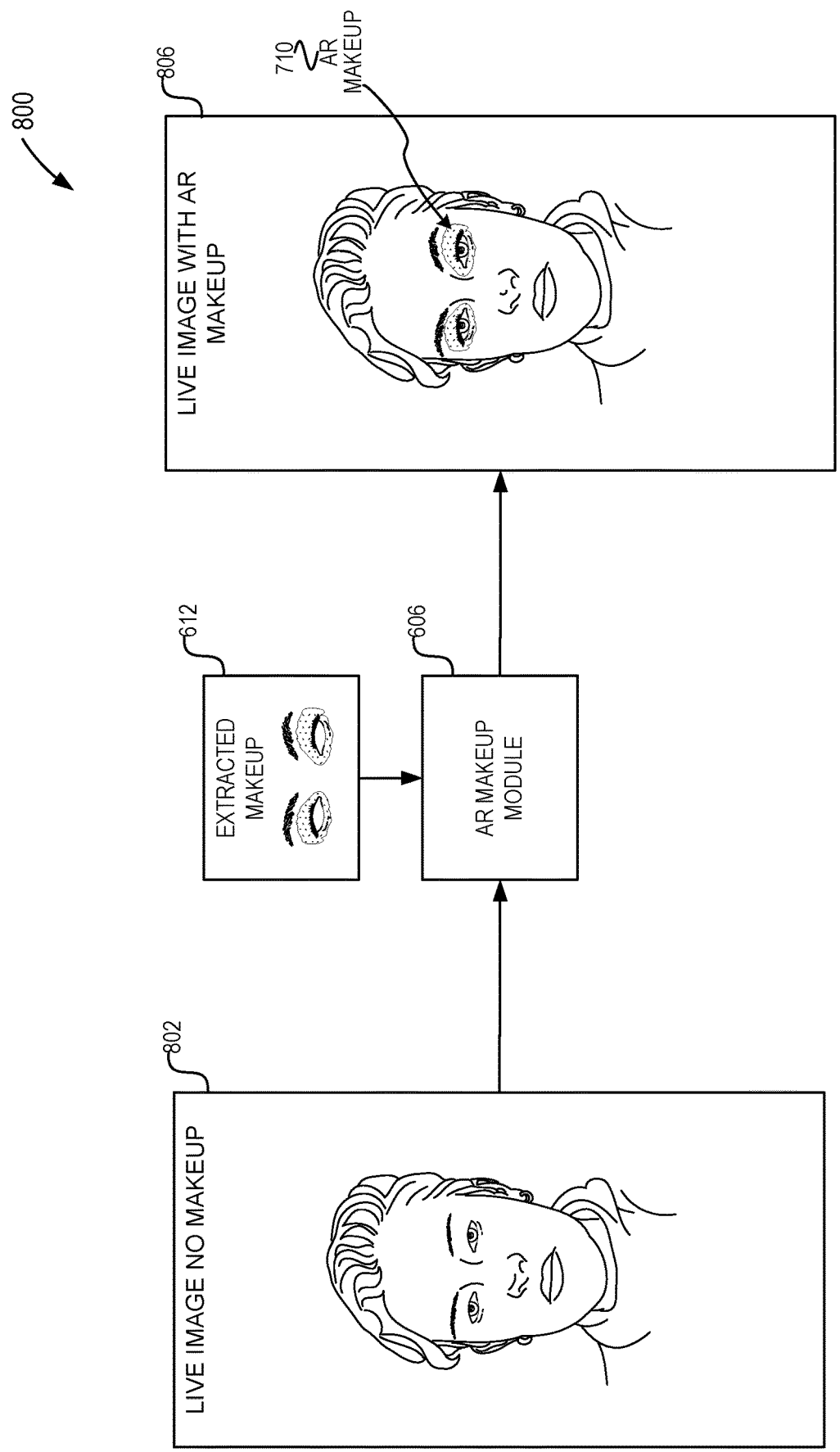
FIG. 8 illustrates an AR makeup system, in accordance with some embodiments.

In some embodiments, the images may be generated from a mobile device such as client device 102 or machine 1800. Makeup image 902 of FIG. 9 is an example of makeup image 602. Exacted makeup image 908 is an example of extracted makeup image 612. Referring to FIG. 8, live image no makeup 802 is an example of no makeup image 608. Live image with AR makeup 806 Is an example of person with AR makeup 610. The term no makeup refers to the no wearing the extracted makeup image 612 as the person or user in the image may have other makeup on. The extracted makeup image 612 may have many different portions such as eyes, eyebrow, lips, cheeks, chin, ears, hair, eyelids, eyelashes, and so forth. As illustrated, extracted makeup image 612 includes eyebrows, eyelashes, and eye makeup. In some embodiments, the extracted makeup image 612 may include body makeup on other areas of a person's body besides the face, such as a torso, thighs, feet, hands, arms, legs, and so forth. The images may be stored in AR makeup table 318.

AR makeup system 214 includes generate AR makeup module 604 and AR makeup module 606. Generate AR makeup module 604 generates AR makeup module 606. Generate AR makeup module 604 takes the makeup image 602 and processes makeup image 602 to separate the makeup from the person to generate extracted makeup image 612. Generate AR makeup module 604 includes extract makeup module 904. For example, as illustrated in FIG. 9, makeup image 902 is processed by extract makeup module 904 to generate extracted makeup image 908 and extracted person 910. Extract makeup module 904 may be a trained neural network, in accordance with some embodiments. Generate AR makeup module 604 then trains AR makeup module 606, which takes no makeup image 608 and extracted makeup image 612 to generate face with AR makeup 610.

Figure 7:
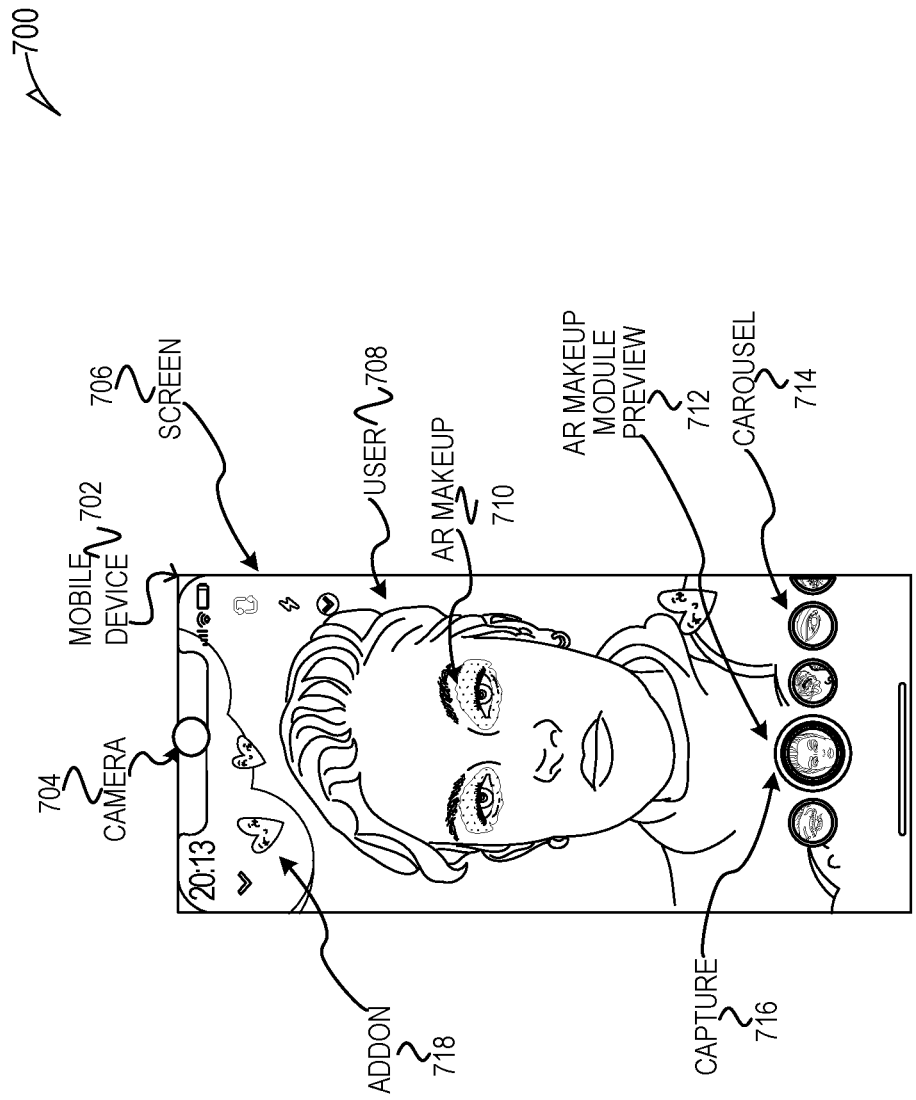
FIG. 7 illustrates an AR makeup system, in accordance with some embodiments.

FIG. 7 illustrates an AR makeup system 700, in accordance with some embodiments. Illustrated in FIG. 7 is mobile device 702, camera 704, screen 706, user 708, AR makeup 710, AR makeup module preview 712, carousel 714, and capture 716. The mobile device 702 is a client device 102 or machine 1800, in accordance with some embodiments. The camera 704 is an image capturing device such as described in conjunction with environmental components 1832 or client device 102. The screen 706 displays an image. The screen 706 may have a pixel resolution and depth of color. The screen 706 may be a screen as disclosed in conjunction with user input components 1826 or client device 102.

The user 708 may be a captured image or live image of a person such as a person that is using the mobile device 702. A live image indicates that the image is being captured or generated by the device and then being displayed on a display in real time. AR makeup 710 is a portion of the user 708 that is added by AR makeup module 606 to simulate the look of the extracted makeup image 612. AR makeup module preview 712 indicates an icon or preview which may be animated to indicate the makeup that will be generated as AR makeup 710 on the image of the user 708 by AR makeup module 606. The carousel 714 is a selection of AR makeup modules 606 that provide different AR makeup 710. The carousel 714 may be a user interaction (UI) element that is slidable with for example a finger. The AR makeup module preview 712 that is within capture 716 determines the AR makeup 710. In some embodiments, the user 708 captures 716 an image or video of themselves with the AR makeup 710 by selecting capture 716. The user 708 may add addons 718 to a captured image or to the image or video being displayed on the screen 706 via UI elements.

FIG. 8 illustrates an AR makeup system 800, in accordance with some embodiments. AR makeup module 606 and extracted makeup image 612 may be the same or similar as AR makeup module 606 and extracted makeup image 612, respectively, as disclosed in conjunction with FIG. 6. The AR makeup module 606 processes the live image no makeup 802 and adds extracted makeup image 612 to generate live image with AR makeup 806 with AR makeup 710, which may be the same or similar as AR makeup 710 as disclosed in conjunction with FIG. 7. The live image with AR makeup 806 may be the same or similar as screen 706 of FIG. 7.

AR makeup module 606 may be trained as disclosed in conjunction with FIG. 15 with extracted makeup image 612 so that AR makeup module 606 does not need a separate image of the extracted makeup image 612 to add AR makeup 710 to live image no makeup 802.

FIG. 9 illustrates an AR makeup system 900, in accordance with some embodiments. Illustrated in FIG. 9 is makeup image 902, 912, extract makeup module 904, weights 906, extracted makeup image 908, and extracted person 910. The extract makeup module 904 takes the makeup image 902 and generates extracted makeup image 908 and extracted person 910. In some embodiments, extract makeup module 904 does not generate the extracted person 910. The extract makeup module 904 is a neural network that is trained as disclosed in conjunction with FIG. 10, in accordance with some embodiments. Makeup image 912 illustrates various makeup. The makeup may be complicated, which may be difficult for a user of the AR makeup system 900 to recreate a makeup look without AR makeup 710.

FIG. 10 illustrates an AR makeup system 1000, in accordance with some embodiments. Illustrated in FIG. 10 is training data 1002, extract makeup module 1010, training module 1014, extracted makeup 1020, and extracted person 1022. Extract makeup module 1010 is part of AR makeup system 214, in accordance with some embodiments. The makeup image 1004 may be the same or similar as makeup image 602. The extracted makeup 1020 may be the same or similar as extracted makeup image 612. The extracted person 1022 may be the same or similar as extracted person 910. The extract makeup module 1010 generates extracted makeup 1020 and extracted person 910 from makeup image 1004. Extract makeup module 1010 operates in accordance with the methods disclosed in conjunction with FIGS. 11-14 to segment makeup image 1004 into portions that have makeup and portions that do not have makeup, in accordance with some embodiments. In some embodiments, extracted person 1022 is the portions of makeup image 1004 that do not include the extracted makeup 1020. The weights 1012 are disclosed in conjunction with FIGS. 11-14, in accordance with some embodiments.

The training module 1014 trains the extract makeup module 1010 to generate extracted makeup 1020 and extracted person 1022 from makeup image 1004. The training module 1014 includes adjust weights module 1016 and determine differences module 1018. The determine differences module 1018 compares the extracted makeup 1020 with the makeup 1006 to determine differences. The adjust weights module 1016 adjusts the weights 1012 of the extract makeup module 1010 to train extract makeup module 1010 in accordance with the differences determined by determine differences module 1018. In some embodiments, determine differences module 1018 determines the difference between extracted person 1022 and no makeup image 1008 and the differences are used by adjust weights module 1016 to adjust the weights 1012 of extract makeup module 1010. The training data 1002 is used as a ground truth or basis for the training. In some embodiments, the makeup 1006 and no makeup image 1008 indicate which portions of the makeup image 1004 is makeup and which portion of makeup image 1004 is not makeup. The makeup image 1004 is feed into the extract makeup module 1010 with weights 1012 and extracted makeup 1020 is generated. Determine differences module 1018 determines the differences between extracted makeup 1020 and a corresponding makeup 1006. In some embodiments, extracted person 1022 is also generated and determine differences module 1018 determines the differences between extracted person 1022 and a corresponding no makeup image 1008. Adjust weights module 1016 is configured to adjust the weights of weights 1012 in accordance with the differences determined by determine differences module 1018. The weights are adjusted using stochastic gradient descent. The extract makeup module 1010 is trained to determine borders between skin of a person without makeup and skin of a person with makeup, in accordance with some embodiments. In some embodiments, a separation border between the makeup and non-makeup is determined using morphological operations.

In some embodiments, the training data 1002 is based on a body part where the makeup is such as a face, eye, cheek, leg, torso, and so forth. The AR makeup system 214 will train multiple neural networks for different body parts and then determine a body part where the makeup is and select the appropriate neural network for the body part. For example, AR makeup system 214 would select a neural network for eyes or face for the makeup image 902 of FIG. 9 in order to extract the extracted makeup image 908. Additionally, the training data 1002 includes a data to indicate for which body part the training data 1002 is for, in accordance with some embodiments.

Figure 11:
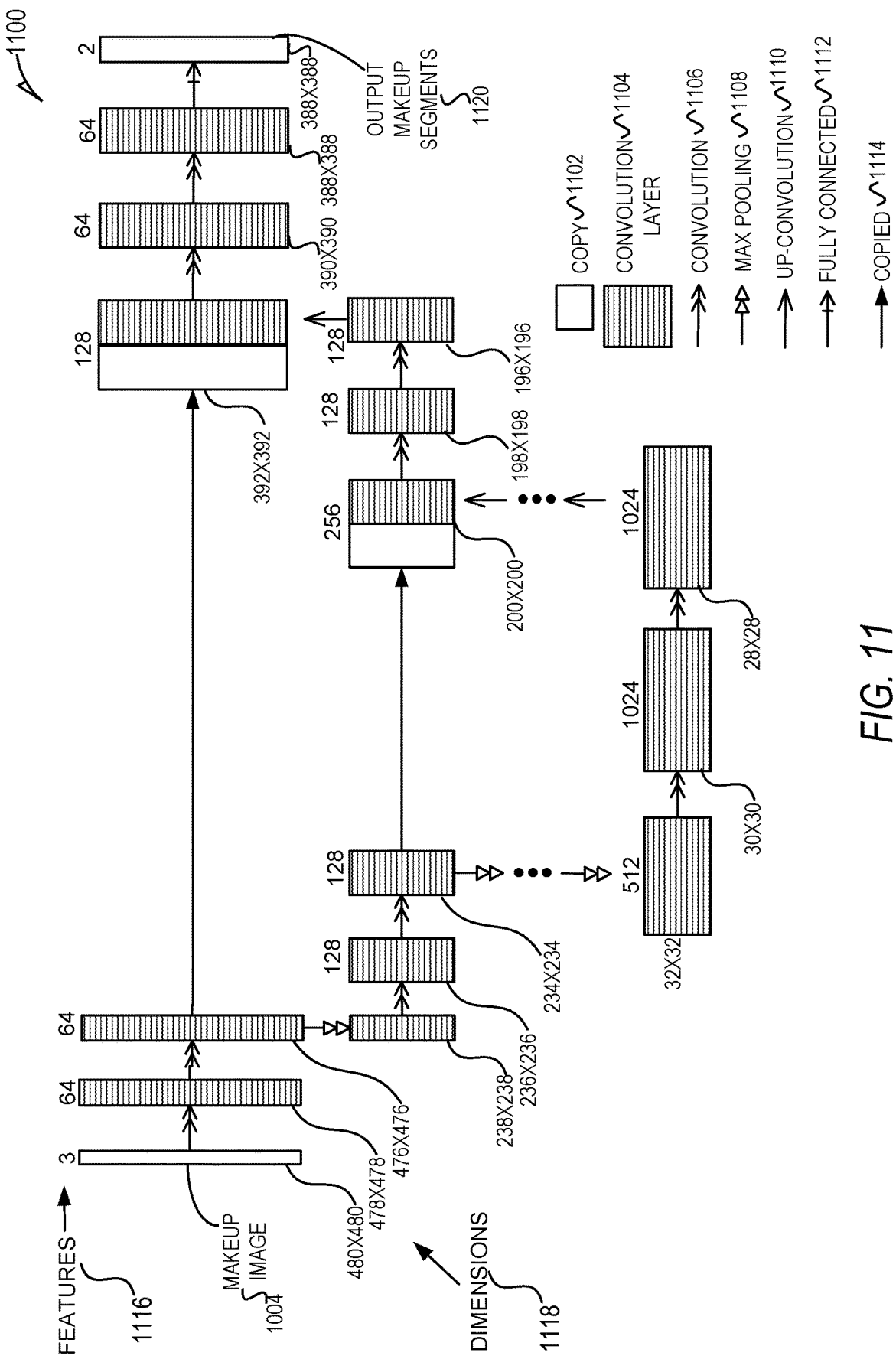
FIG. 11 illustrates a neural network to determine segments with makeup, in accordance with some embodiments.

FIGS. 11-14 illustrate the operation of extract makeup module 1010, in accordance with some embodiments. FIG. 11 illustrates a neural network 1100 to determine segments with makeup, in accordance with some embodiments. The neural network 1100 takes makeup image 1004 and processes it to output makeup segments 1120. Makeup image 1004 may have a depth of three or more to indicate an intensity of different colors. Output makeup segments 1120 indicates which segments of makeup image 1004 are makeup. Output makeup segments 1120 can be split into extracted makeup 1020 and extracted person 1022 by including the portions of makeup image 1004 that are indicated as makeup in extracted makeup 1020 and by including the portions of makeup image 1004 that are not indicated as makeup in extracted person 1022. The makeup image 1004 is indicated as having a dimension 1118 of 480×480×3 values; however, a different number of values may be used and the values may be a number to indicate an intensity for a displayed pixel.

The operation of the neural network 1100 is disclosed as follows. The convolution layers 1104 operate on the previous layer by applying Equation (1). The convolution layers 1104 lose dimensions 1118 because the features are applied only to whole number of values as disclosed in FIG. 12. For example, the dimensions 1118 go from 480×480 for a convolution layer 1104 to dimensions 1118 of 478×478. The features 1116 indicate the number of features 1116 that are used in the convolution 1106 where each convolution 1106 of a feature 1116 results in a layer or channel of a convolution layer 1104.

Figure 12:
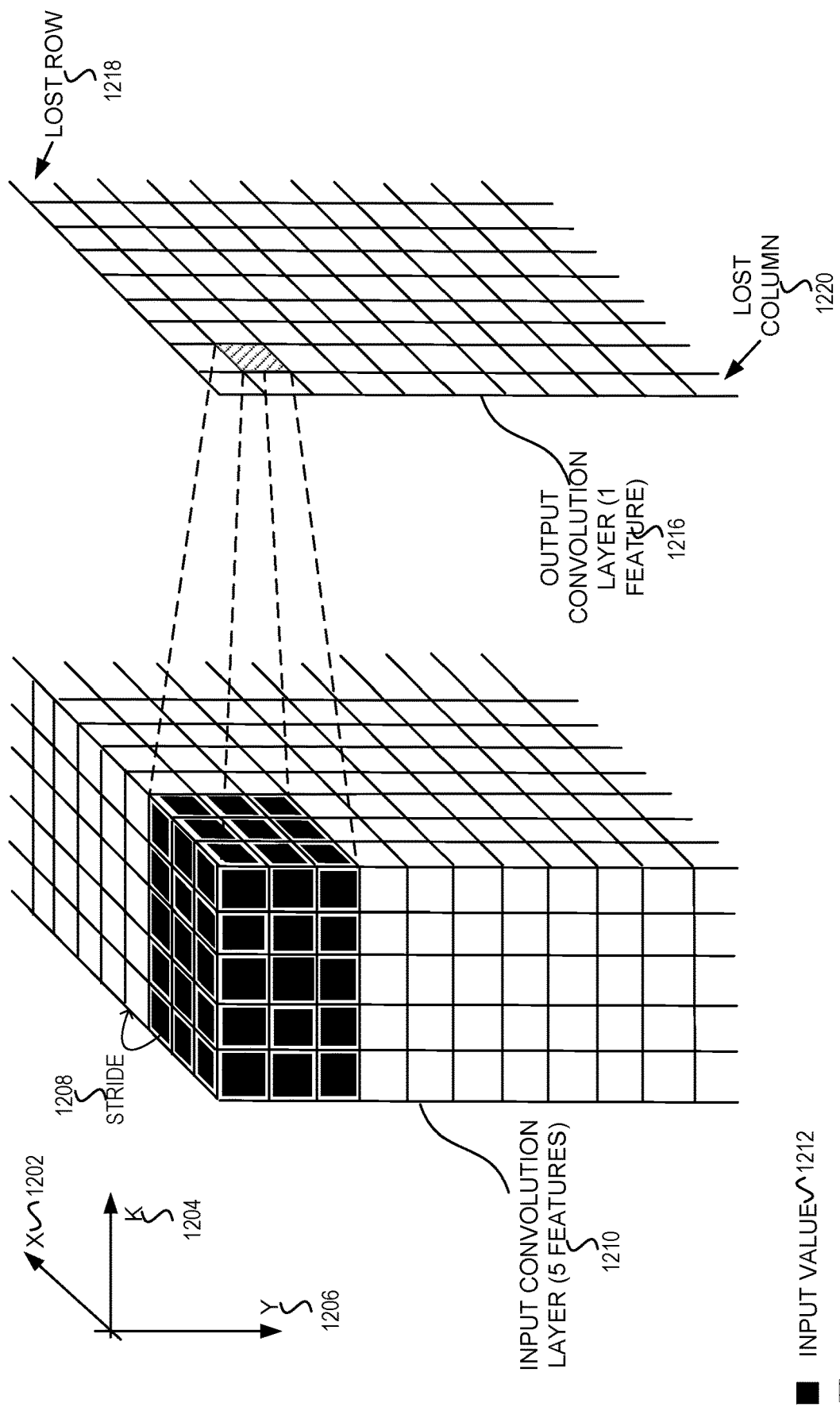
FIG. 12 illustrates a convolution to determine an output value of an output convolution layer, in accordance with some embodiments.

Equation (1) is disclosed in conjunction with FIG. 12. FIG. 12 illustrates a convolution 1106 to determine an output value 1214 of an output convolution layer 1216, in accordance with some embodiments. The output convolution layer 1216 is one layer or channel of the convolution layer 1104. The output convolution layer 1216 is termed an output feature map, in accordance with some embodiments. The input convolution layer 1210 is termed an input feature map, in accordance with some embodiments. As an example, the input convolution layer 1210 includes 5 features or channels to determine the output convolution layer 1216. The application of one feature is used to determine the output values 1214. The output value 1214 is determined from values from a 3×3×5 set of input values 1212. The lost column 1220 and lost row 1218 indicate that a row and column are lost because the feature goes from 3×3×5 input values 1212 to one output value 1214 and the output value 1214 is not determined for fewer than 3×3×5 input values 1212, in accordance with some embodiments. Referring to FIG. 11, the convolution layer 1104 with 64 features 1116 and 476×476 dimensions 1118 is determined by convolution 1106 that determines an output value from 3×3×64 input values from convolution layer 1104 with 64 features 1116 and 478×478 dimensions 1118.

The output convolution layer 1216 is determined with a stride 1208 of one, which means that the 3×3×5 input values 1212 are moved over one place in the x 1202 direction, or equivalently in the y 1206 direction, for the next output value 1214. Equation (1) is used to determine the output value (o) 1214 for a feature (f) at x 1202, y 1206, and k 1204, where k 1204 is the feature dimension.

Equation (1): $o_{x,y,f} = \text{ReLU}(\Sigma_{i,j,k} w_{i,j,k,f} * a_{x+i,y+j,k} c_f)$, for $i=(-1, 0, 1)$; $j=(-1, 0, +1)$; $k=1$ to number of features; ReLU is the activation function that indicates rectified linear unit; i is the x position, j is the y position, and f is the feature position; $w_{i,j,k,f}$ indicates the weight for position i, j, k, and f, where k is the output convolution layer 1216, which is just one here, and f is the feature; $o_{x,y,f}$ indicates the output value at position x, y for feature (f); $a_{x+i,y+j,k}$ indicates the activation value or output values 1214 for the feature k; and, $c_f$ indicates a constant value. As illustrated, there is only one output convolution layer 1216 in FIG. 12, however, in the convolution layers 1104 of FIG. 11 there are 64, 128, 512, and 1024 features 1116, which each generate an output convolution layer 1216. The AR makeup system 214 stores data for the convolution layers 1104 in AR makeup table 318 as arrays of values, in accordance with some embodiments.

Returning to FIG. 11, each of the convolution layers 1104 are determined by a convolution 1106 using Equation (1), in accordance with some embodiments. In FIG. 11 the convolutions 1106 go from left to right where each convolution 1106 reduces the dimensions 1118 by two for the x and y dimension. An array may hold the values or activations for a convolution layer 1104 in an array that is dimensions 1118 by features 1116 in size such as 480×480 by 64. A feature 1116 has a weight for each value in the convolution layer 1104 so that each feature will have a weight array the size of dimensions 1118 by features 1116 of a previous convolution layer 1104. As an example, each feature 1116 in the convolution layer 1104 with 476×476 dimensions 1118 will have a weight array of size 64×478×478, which is the number of activation values in the previous convolution layer 1104. The number of features 1116 increases and then decreases from the makeup image 1004 to the output makeup segments 1120. Additionally, the dimensions 1118 decrease and then increase from the makeup image 1004 to the output makeup segments 1120.

Figure 13:
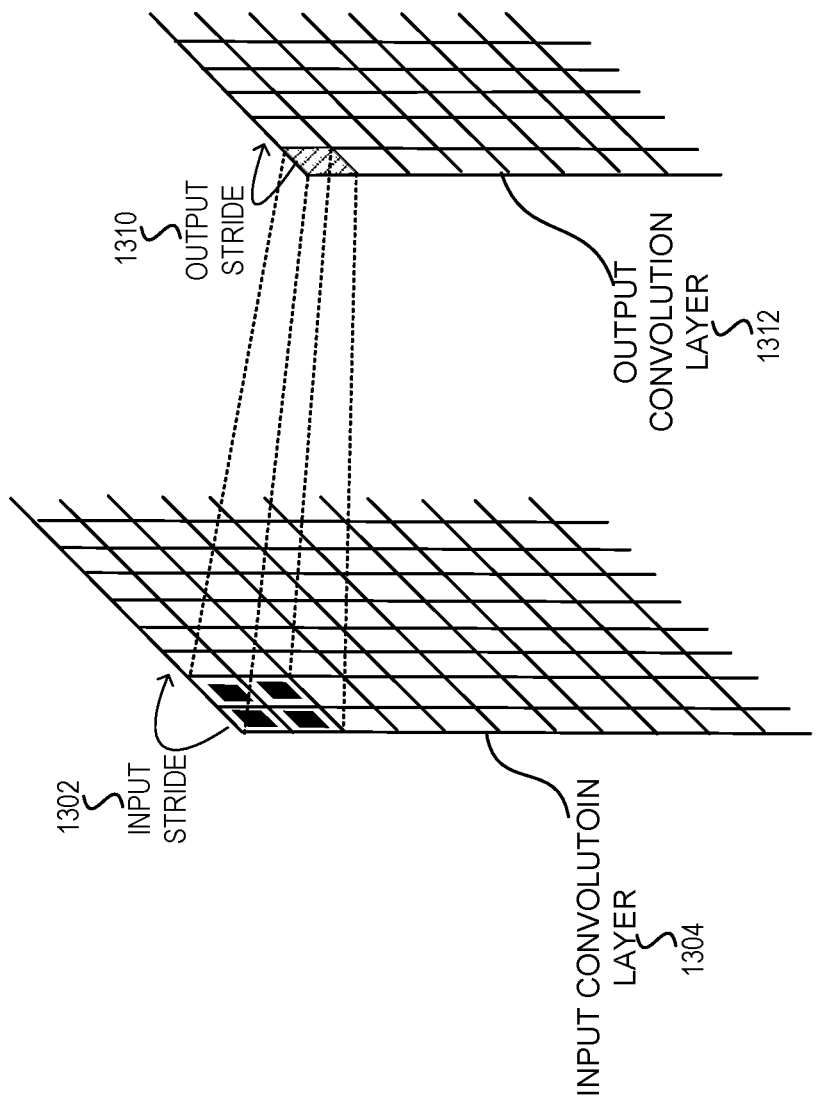
FIG. 13 illustrates the operation of max pooling, in accordance with some embodiments.

FIG. 13 illustrates the operation of max pooling 1108, in accordance with some embodiments. In max pooling 1108, the largest value for input values 1306 of an input convolution layer 1304 is used as the output value 1308 for the output convolution layer 1312. Equation 2 may be used to determine the output convolution layer 1312. The max pooling 1108 may be termed a maximum pooling operation, in accordance with some embodiments.

$$o_{x,y,f} = \max_{i=0,1; j=0,1} (a_{2x+i, 2y+j, k}),\qquad \text{Equation (2)}$$

where o is the output value 1308 at position x,y for feature k of the output convolution layer 1312. The input stride 1302 is two so that four input values 1306 become one output value 1308. The output stride 1310 is one. The dimensionality of the convolution layer 1104 is reduced after a max pooling 1108 operation. For example, returning to FIG. 11, convolution layer 1104 with a 476×476 dimensions 1118 is reduced to a 238×238 dimensions 1118 after application of max pooling 1108.

Up-convolution 1110 takes a convolution layer 1104 expands the dimensions 1118 of the convolution layer 1104. Copied 1114 appends the convolution layer 1104 from an earlier convolution 1106 to results of a convolution 1106. As an example, the convolution layer 1104 with 128 features 1116 and 196×196 dimensions 1118 has an up-convolution 1110 and copied 1114 performed on it to generate the convolution layer 1104 with 128 features 1116 and 392×392 dimensions 1118, which is indicated with both the copy 1102 and convolution layer 1104. The up-convolution 1110 may be termed an up-convolution operation, in accordance with some embodiments. The copy 1102 may be termed a copy operation, in accordance with some embodiments.

Figure 14:
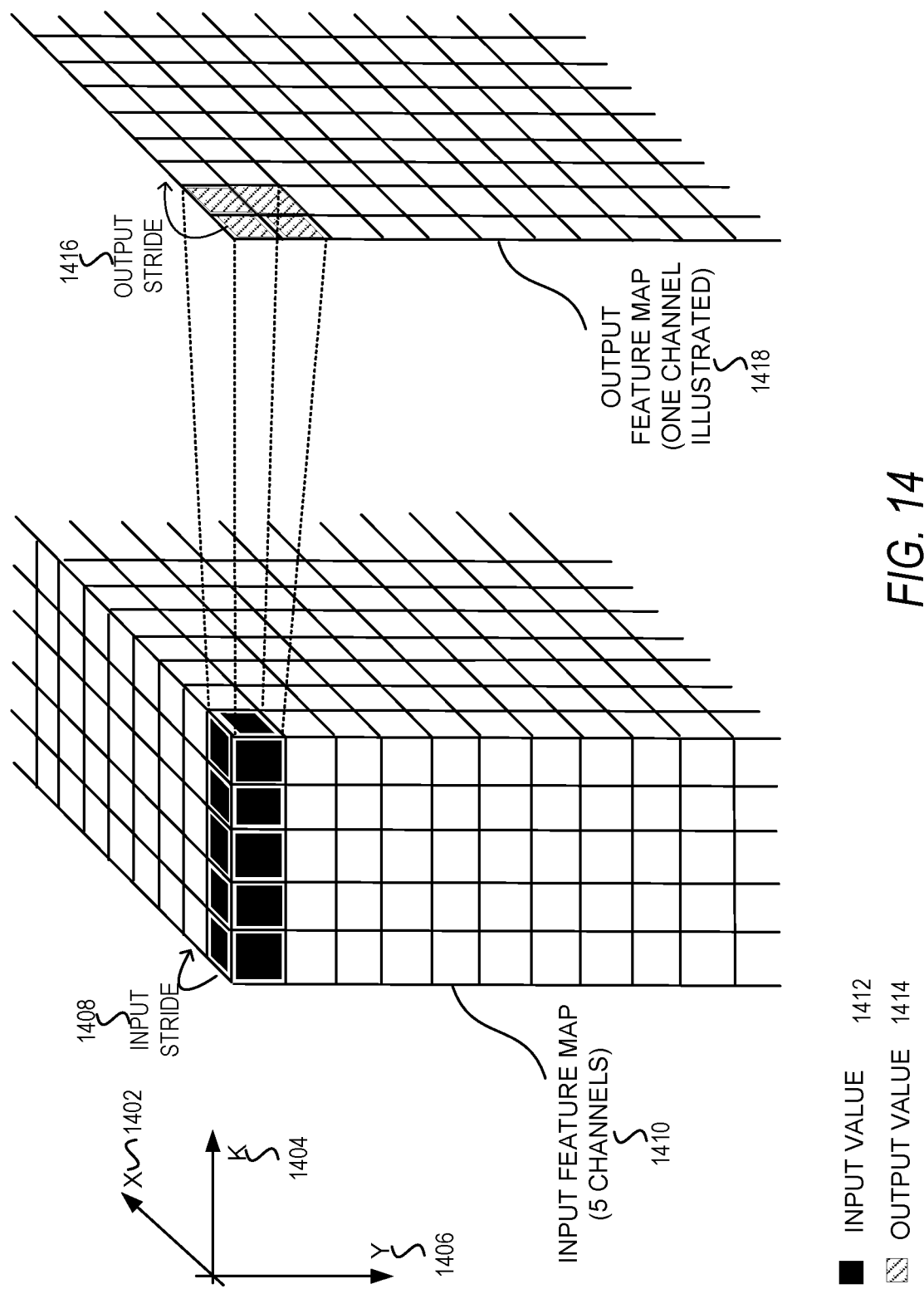
FIG. 14 illustrates the operation of up-convolution, in accordance with some embodiments.

FIG. 14 illustrates the operation of up-convolution 1110, in accordance with some embodiments. The output convolution layer 1418 is determined from the input convolution layer 1410 in accordance with Equation (3).

Equation (3): $o_{2x+i,2y+j,f} = \text{ReLU}(\Sigma_{i,j,k} w_{i,j,k,f} * a_{x,y,k} + c_f)$, for $i=(-1, 0, 1)$; $j=(-1, 0, +1)$; $k=1$ to number of features; ReLU is the activation function that indicates rectified linear unit; i is the x position, j is the y position; $w_{i,j,k,f}$ indicates the weight for position i, j, k, and f; $o_{2x+i,2y+j,f}$ indicates the output value 1412 at Positions 2x+i, 2y+j for feature (f) for i=0 and 1, and j=0 or 1; $a_{x,y,k}$ indicates the activation value or output value 1414 for the feature k; and, $c_f$ indicates a constant value. The input stride 1408 is one and the output stride 1416 is two. A channel or layer is determined based on one feature being applied to a previous convolution layer 1104 or the makeup image 1004. The directions are indicated by x 1402, y 1406, and k 1404, where k 1404 is the feature dimension.

Returning to FIG. 11, the output makeup segments 1120 is determined with a fully connected 1112 layer operation from convolution layer 1104 with 64 features and 388×388 dimensions 1118. The output of the fully connected 1112 layer is binary as either being included in the makeup or not being included in the makeup for each of the positions of the output makeup segments 1120. The number of features 1116 and dimensions 1118 may be different, in accordance with some embodiments. In some embodiments, the output makeup segments 1120 has a dimension that is smaller than the input dimensions of the makeup image 1004. The output makeup segments 1120 are proportionally mapped to the makeup image 1004, in accordance with some embodiments.

FIG. 15 illustrates the operation of AR makeup module 606, in accordance with some embodiments. A no makeup image 608 and extracted makeup image 612 are fed into AR makeup module 606 that processes the no makeup image 608 and extracted makeup image 612 to generate person with AR makeup 610.

In some embodiments, AR makeup module 606 is a feed forward neural network trained with deep learning that determines person with AR makeup 610 using weights 1504. In some embodiments AR makeup module 606 uses different methods to generate the person with AR makeup 610 such as determining contours of a live image of a face and scaling and rotating the extracted makeup image 612. The weights 1504 are trained by the training module 1506 for a specific extracted makeup image 612 so that the weights 1504 are specific to the particular extracted makeup image 612.

A technical problem is that to train the AR makeup module 606 it may be difficult to obtain ground truth examples of no makeup image 608 and makeup image 602 of the same person. For example, no makeup image 608 may include same face 1516 where the faces are the same for the makeup image 602 and no makeup image 608. The AR makeup module 606 may be trained differently depending on whether the no makeup image 608 is of the same person of the makeup image 602. No makeup image 608 may be largely made up of different face 1518 so that it may be difficult to train the AR makeup module 606 by comparing the makeup image 602 with the person with AR makeup 610 as the underlying faces are different.

The training module 1506 is fed the no makeup image 608, extracted makeup image 612, makeup image 602, and the output of the AR makeup module 606 of person with AR makeup 610. The person with AR makeup 610 may be a series of images or a single image.

The training module 1506 may train the weights 1504 in a number of different ways. Determine style differences module 1510 may determine differences based on pixel by pixel differences between the person with AR makeup 610 and makeup image 602 when the no makeup face image 608 is the same face 1516. For example, pixel loss may be determined based on a Euclidian distance between makeup image 602 and person with AR makeup 610. The adjust weight module 1508 may then apply backpropagation to the AR makeup module 606 to train the weights 1504. This process is iterated until the differences determined by determine style differences modules 1510 are below a predetermined threshold.

In some embodiments, determine style differences module 1510 may determine the differences based on comparing the person with AR makeup 610 and the extracted makeup image 612 when the no makeup image 608 is a different face 1518. The style 1512 may be one or more styles that are used to determine differences between the extracted makeup image 612 and the person with AR makeup 610. The differences are determined based on high-level perceptual and semantic differences between the person with AR makeup 610 and extracted makeup image 612. The style 1512 may be a pretrained network to detect the high-level perceptual and semantic differences such as the location of the changes of the different face 1518 from the extracted makeup image 612. There may be more than one style 1512 with different pretrained networks. Example styles 1512 includes colors, textures, common patterns, and so forth. The adjust weight module 1508 then adjusts the weights to minimize the style 1512 differences between the extracted makeup image 612 and the person with AR makeup 610 using backpropagation. Determining differences based on style 1512 is a technical solution to determining differences between images when a ground truth image is not available. The adjust weight module 1508 may then apply backpropagation to the AR makeup module 606 to train the weights 1504. This process is iterated until the differences determined by determine style differences modules 1510 are below a predetermined threshold.

In some embodiments, determine style differences module 1510 determines the differences between person with AR makeup 610 by feeding person with AR makeup 610 into extract makeup module 904 to generate extracted makeup image 908. The determine style differences module 1510 then determines the difference between the extracted makeup image 908 and extracted makeup image 612. The adjust weight module 1508 may then apply backpropagation to the AR makeup module 606 to train the weights 1504. This process is iterated until the differences determined by determine style differences modules 1510 are below a predetermined threshold.

The determine content differences module 1514 may determine the differences between the person with AR makeup 610 and no makeup image 608. The differences may be determined based on a pixel by pixel comparison. The adjust weight module 1508 may then apply backpropagation to the AR makeup module 606 to train the weights 1504. The determine content differences module 1514 may ensure that the person with AR makeup 610 is not distorted by the extracted makeup image 612. The adjust weight module 1508 may then apply backpropagation to the AR makeup module 606 to train the weights 1504. In some embodiments, the differences determined by the determine content differences module 1514 and the differences determined by determine style differences module 1510 are used to train the weights 1504 of the AR makeup module 606.

The no makeup image 608 may be used to train the AR makeup module 606 when there are same faces 1516 or different faces 1518. A user may prepare many same faces 1516 that have predetermined face or body positions. The user may then take different makeup images 602 with different makeup and train the AR makeup module 606 using the same faces 1516 and make images 602 as a ground truth. In some embodiments, there are pairs of images of a same face 1516 and a makeup image 602. In some embodiments, the makeup images 602 and same face 1516 images may be indicated with a facial position so that the AR makeup module 606 can adjust for different facial positions. There may be different face 1518 images that are used to train the AR makeup module 606 for makeup images 602, but since the faces are different, they are not a ground truth for training the AR makeup module 606. However, the different face 1518 images may still have orientation information so that a different face 1518 image may be selected with a same or similar orientation as a makeup image 602. The makeup image 602 may be selected by a user of the messaging system 100. In some embodiments, training module 1506 is configured to determine an orientation of the makeup image 602 and then select a different face 1518 with a same or similar orientation to feed into the AR makeup module 606 so that errors from orientation are lessened. The determine style differences module 1510 in this case may use the style 1512 to determine differences since there is not a ground truth with which to work from.

Figure 16:
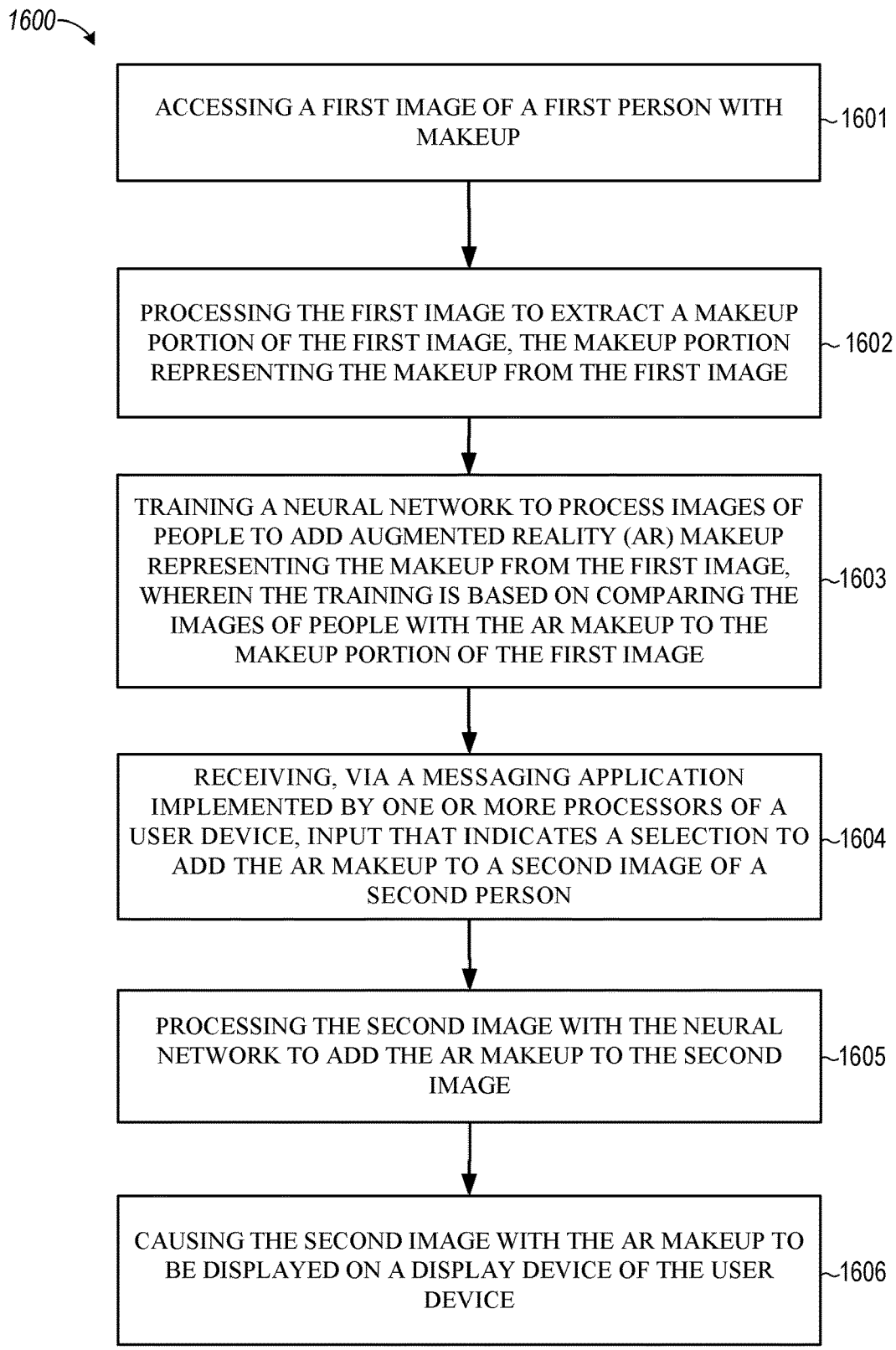
FIG. 16 illustrates a method of processing images to add AR makeup, in accordance with some embodiments.

FIG. 16 illustrates a method 1600 of processing images to add AR makeup, in accordance with some embodiments. The method 1600 begins at operation 1601 with accessing a first image of a first person with makeup. For example, AR makeup system 214 of FIG. 6 may access makeup image 602. For example, makeup image 602 is displayed on the client device 102 and the user of the client device 102 selects the makeup image 602.

The method 1600 continues at operation 1602 with processing the first image to extract a makeup portion of the first image, the makeup portion representing the makeup from the first image. For example, as illustrated in FIG. 9, makeup image 902 is fed into extract makeup module 904 to generate extracted makeup image 908.

The method 1600 continues at operation 1603 with training a neural network to process images of people to add AR makeup representing the makeup from the first image, where the training is based on comparing the images of people with the AR makeup to the makeup portion of the first image. For example, as illustrated in FIG. 15, no makeup image 608 is fed into AR makeup module 606 to generate person with AR makeup 610. The training module 1506 then compares the person with the AR makeup 610 with extracted makeup image 612 to determine differences. The training module 1506 then adjusts the weights 1504 of the AR makeup module 606.

The method 1600 continues at operation 1604 with receiving, via a messaging application implemented by one or more processors of a user device, input that indicates a selection to add the AR makeup to a second image of a second person. For example, referring to FIG. 7, AR makeup system 214 receives input that selects AR makeup module preview 712.

The method 1600 continues at operation 1605 with processing the second image with the neural network to add the AR makeup to the second image. For example, referring to FIG. 8, the AR makeup module 606 processes live image no makeup 802 to generate live image with AR makeup 806.

The method 1600 continues at operation 1606 with causing the second image with the AR makeup to be displayed on a display device of the user device. For example, referring to FIG. 7, user 708 is displayed with AR makeup 710 on the screen 706 of mobile device 702.

Method 1600 may include one or more additional operations. The operations of method 1600 may be performed in a different order. One or more of the operations of method 1600 may be optional.

In some embodiments, operations 1601, 1602, and 1603 are performed on a server computer such as application servers 112 of FIG. 1, and then the trained neural network or weights are downloaded or provided to a client device 102 where operations 1604, 1605, and 1606 are performed.

In some embodiments, operations 1601, 1604, 1605, and 1606 may be performed on a client device 102 where operations 1601, 1602, and 1603 are performed by a server computing device such as the application servers 112 of FIG. 1. Operation 1601 may be performed by both the application servers 112 of FIG. 1 and the client device 102. Additionally, the application servers 112 may download or provide the trained neural network or weights to client device 102. Different divisions of the operations between the application servers 112 and the client device 102 may be used.

Figure 17:
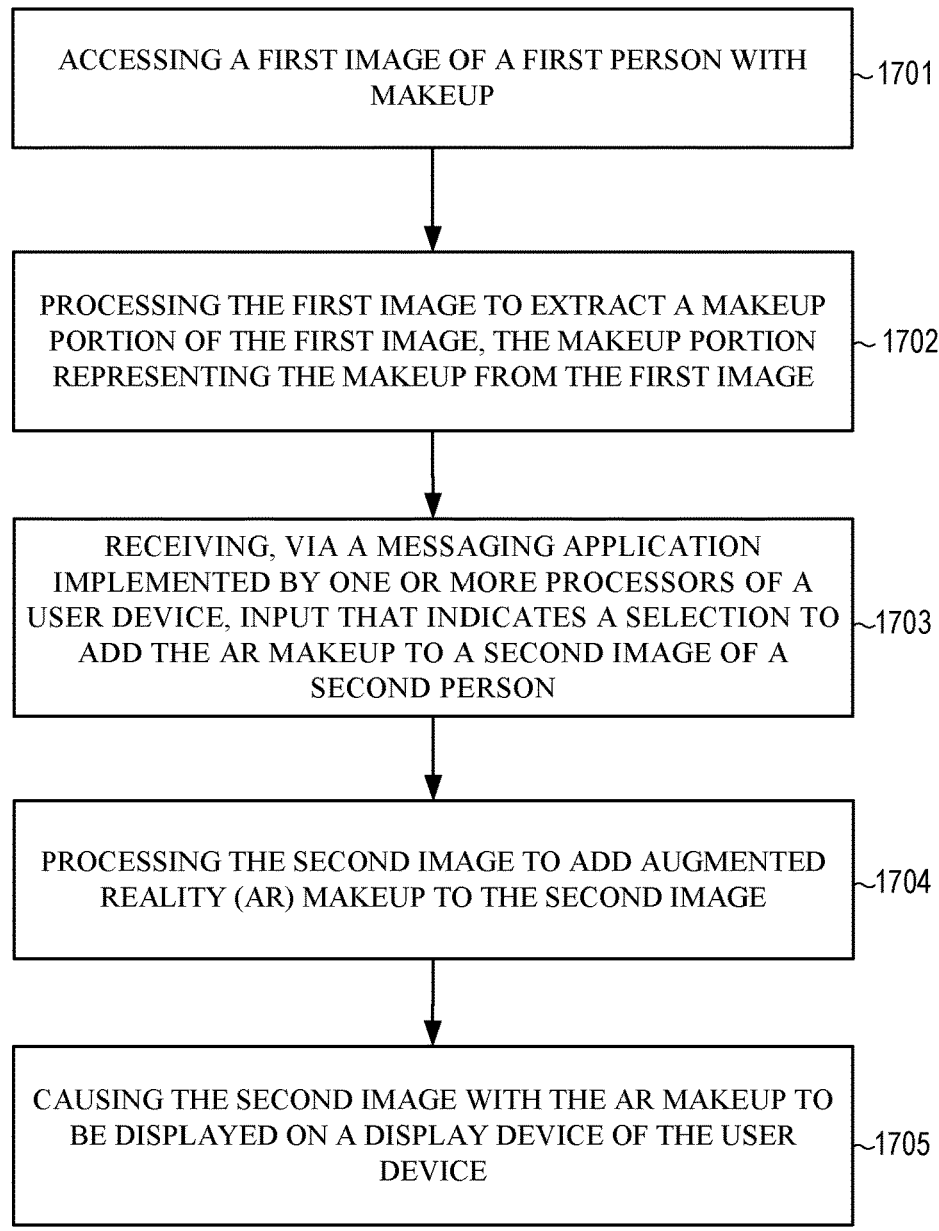
FIG. 17 illustrates a method of processing images to add AR makeup, in accordance with some embodiments.

FIG. 17 illustrates a method 1700 of processing images to add AR makeup, in accordance with some embodiments.

The method 1700 begins at operation 1701 with accessing a first image of a first person with makeup. For example, AR makeup system 214 of FIG. 6 may access makeup image 602. For example, makeup image 602 is displayed on the client device 102 and the user of the client device 102 may select the makeup image 602.

The method 1700 continues at operation 1702 with processing the first image to extract a makeup portion of the first image, the makeup portion representing the makeup from the first image. For example, as illustrated in FIG. 9, makeup image 902 is fed into extract makeup module 904 to generate extracted makeup image 908.

The method 1700 continues at operation 1703 with receiving, via a messaging application implemented by one or more processors of a user device, input that indicates a selection to add AR makeup to a second image of a second person. For example, referring to FIG. 7, AR makeup system 214 receives input that selects AR makeup module preview 712.

The method 1700 continues at operation 1704 with processing the second image with to add the AR makeup to the second image. For example, referring to FIG. 8, the AR makeup module 606 processes live image no makeup 802 to generate live image with AR makeup 806. The AR makeup module 606 may be based on determining geometric lines of the face in live image no makeup 802 and adjusting extracted makeup image 612 to lay the extracted makeup image 612 on the live image no makeup 802. The AR makeup module 606 may adjust the extracted makeup image 612 by determining a location to place the live image no makeup 802 and scaling for size and rotating the extracted makeup image 612 to fit the live image no makeup 802.

The method 1700 continues at operation 1705 with causing the second image with the AR makeup to be displayed on a display device of the user device. For example, referring to FIG. 7, user 708 is displayed with AR makeup 710 on the screen 706 of mobile device 702. Method 1700 may include one or more additional operations. The operations of method 1700 may be performed in a different order. One or more of the operations of method 1700 may be optional.

Machine Architecture

Figure 18:
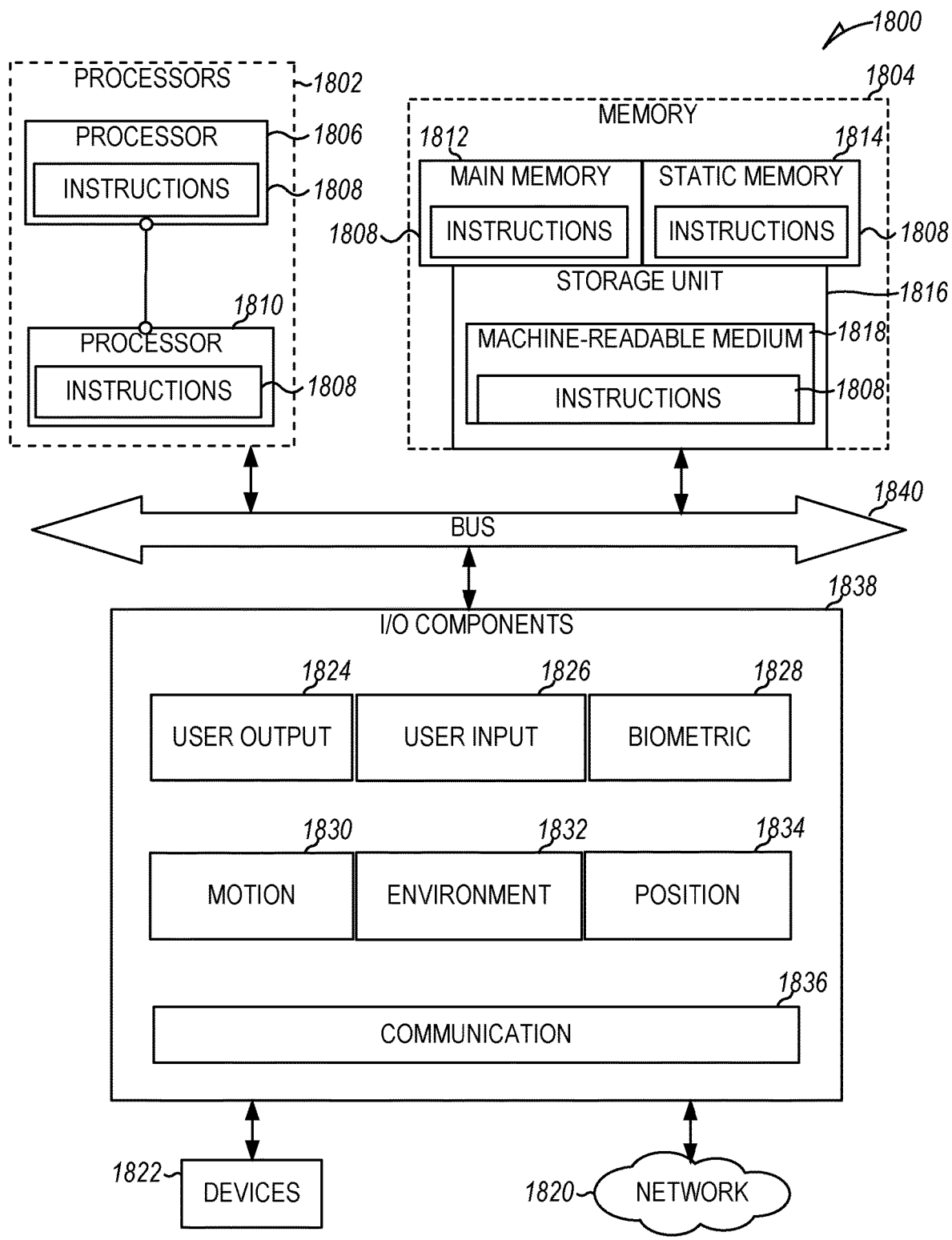
FIG. 18 is a diagrammatic representation of a machine in the form of a computer system within which a set of instructions may be executed for causing the machine to perform any one or more of the methodologies discussed herein, in accordance with some examples.

FIG. 18 is a diagrammatic representation of the machine 1800 within which instructions 1808 (e.g., software, a program, an application, an applet, an app, or other executable code) for causing the machine 1800 to perform any one or more of the methodologies discussed herein may be executed. For example, the instructions 1808 may cause the machine 1800 to execute any one or more of the methods described herein. The instructions 1808 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1808, sequentially or otherwise, that specify actions to be taken by the machine 1800. Further, while only a single machine 1800 is illustrated, the term "machine" shall also be taken to include a collection of machines that individually or jointly execute the instructions 1808 to perform any one or more of the methodologies discussed herein. The machine 1800, for example, may comprise the client device 102 or any one of a number of server devices forming part of the messaging server system 108. In some examples, the machine 1800 may also comprise both client and server systems, with certain operations of a particular method or algorithm being performed on the server-side and with certain operations of the particular method or algorithm being performed on the client-side.

The machine 1800 may include processors 1802, memory 1804, and input/output I/O components 1838, which may be configured to communicate with each other via a bus 1840. The processors 1802 may be termed computer processors, in accordance with some embodiments. In an example, the processors 1802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1806 and a processor 1810 that execute the instructions 1808. The term "processor" is intended to include multi-core processors that may comprise two or more independent processors (sometimes referred to as "cores") that may execute instructions contemporaneously. Although FIG. 18 shows multiple processors 1802, the machine 1800 may include a single processor with a single-core, a single processor with multiple cores (e.g., a multi-core processor), multiple processors with a single core, multiple processors with multiples cores, or any combination thereof.

The memory 1804 includes a main memory 1812, a static memory 1814, and a storage unit 1816, both accessible to the processors 1802 via the bus 1840. The main memory 1804, the static memory 1814, and storage unit 1816 store the instructions 1808 embodying any one or more of the methodologies or functions described herein. The instructions 1808 may also reside, completely or partially, within the main memory 1812, within the static memory 1814, within machine-readable medium 1818 within the storage unit 1816, within at least one of the processors 1802 (e.g., within the Processor's cache memory), or any suitable combination thereof, during execution thereof by the machine 1800.

The I/O components 1838 may include a wide variety of components to receive input, provide output, produce output, transmit information, exchange information, capture measurements, and so on. The specific I/O components 1838 that are included in a particular machine will depend on the type of machine. For example, portable machines such as mobile phones may include a touch input device or other such input mechanisms, while a headless server machine will likely not include such a touch input device. It will be appreciated that the I/O components 1838 may include many other components that are not shown in FIG. 18. In various examples, the I/O components 1838 may include user output components 1824 and user input components 1826. The user output components 1824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1838 may include biometric components 1828, motion components 1830, environmental components 1832, or position components 1834, among a wide array of other components. For example, the biometric components 1828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1830 include acceleration sensor components (e.g., accelerometer), gravitation sensor components, rotation sensor components (e.g., gyroscope).

The environmental components 1832 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1838 further include communication components 1836 operable to couple the machine 1800 to a network 1820 or devices 1822 via respective coupling or connections. For example, the communication components 1836 may include a network interface Component or another suitable device to interface with the network 1820. In further examples, the communication components 1836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1822 may be another machine or any of a wide variety of peripheral devices (e.g., a peripheral device coupled via a USB).

Moreover, the communication components 1836 may detect identifiers or include components operable to detect identifiers. For example, the communication components 1836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1836, such as location via Internet Protocol (IP) geolocation, location via Wi-Fi® signal triangulation, location via detecting an NFC beacon signal that may indicate a particular location, and so forth.

The various memories (e.g., main memory 1812, static memory 1814, and memory of the processors 1802) and storage unit 1816 may store one or more sets of instructions and data structures (e.g., software) embodying or used by any one or more of the methodologies or functions described herein. These instructions (e.g., the instructions 1808), when executed by processors 1802, cause various operations to implement the disclosed examples.

The instructions 1808 may be transmitted or received over the network 1820, using a transmission medium, via a network interface device (e.g., a network interface component included in the communication components 1836) and using any one of several well-known transfer protocols (e.g., hypertext transfer protocol (HTTP)). Similarly, the instructions 1808 may be transmitted or received using a transmission medium via a coupling (e.g., a peer-to-peer coupling) to the devices 1822.

Software Architecture

Figure 19:
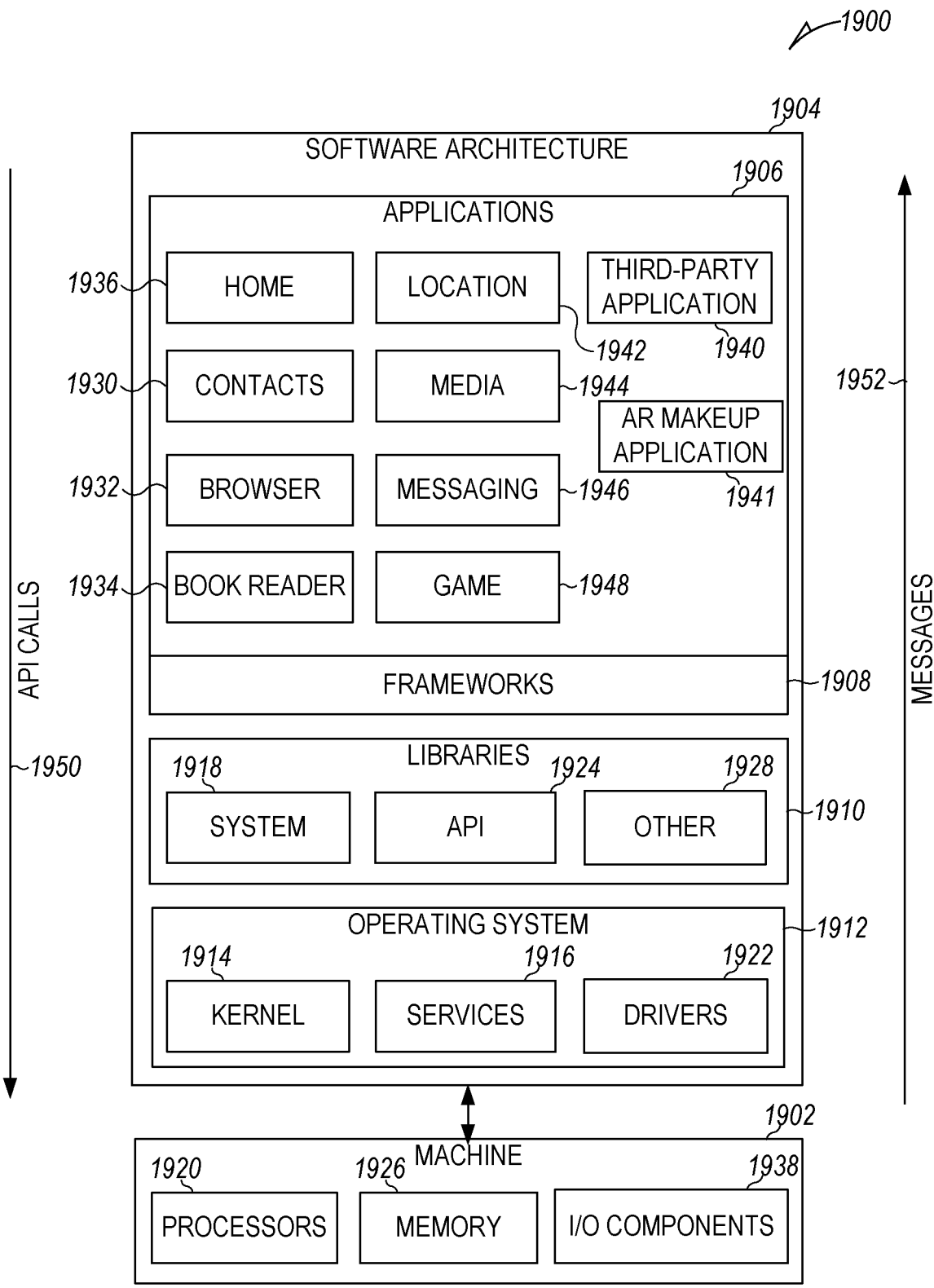
FIG. 19 is a block diagram showing a software architecture within which examples may be implemented.

FIG. 19 is a block diagram 1900 illustrating a software architecture 1904, which can be installed on any one or more of the devices described herein. The software architecture 1904 is supported by hardware such as a machine 1902 that includes processors 1920, memory 1926, and I/O components 1938. In this example, the software architecture 1904 can be conceptualized as a stack of layers, where each layer provides a particular functionality. The software architecture 1904 includes layers such as an operating system 1912, libraries 1910, frameworks 1908, and applications 1906. Operationally, the applications 1906 invoke API calls 1950 through the software stack and receive messages 1952 in response to the API calls 1950.

The operating system 1912 manages hardware resources and provides common services. The operating system 1912 includes, for example, a kernel 1914, services 1916, and drivers 1922. The kernel 1914 acts as an abstraction layer between the hardware and the other software layers. For example, the kernel 1914 provides memory management, processor management (e.g., scheduling), component management, networking, and security settings, among other functionality. The services 1916 can provide other common services for the other software layers. The drivers 1922 are responsible for controlling or interfacing with the underlying hardware. For instance, the drivers 1922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1910 provide a common low-level infrastructure used by the applications 1906. The libraries 1910 can include system libraries 1918 (e.g., C standard library) that provide functions such as memory allocation functions, string manipulation functions, mathematic functions, and the like. In addition, the libraries 1910 can include API libraries 1924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1910 can also include a wide variety of other libraries 1928 to provide many other APIs to the applications 1906.

The frameworks 1908 provide a common high-level infrastructure that is used by the applications 1906. For example, the frameworks 1908 provide various graphical user interface (GUI) functions, high-level resource management, and high-level location services. The frameworks 1908 can provide a broad spectrum of other APIs that can be used by the applications 1906, some of which may be specific to a particular operating system or platform.

In an example, the applications 1906 may include a home application 1936, a contacts application 1930, a browser application 1932, a book reader application 1934, an AR makeup application 1941, a location application 1942, a media application 1944, a messaging application 1946, a game application 1948, and a broad assortment of other applications such as a third-party application 1940. The AR makeup application 1941 may be the same or similar as AR makeup system 214 as disclosed in conjunction with FIG. 6 and herein. The applications 1906 are programs that execute functions defined in the programs. Various programming languages can be employed to create one or more of the applications 1906, structured in a variety of manners, such as object-oriented programming languages (e.g., Objective-C, Java, or C++) or procedural programming languages (e.g., C or assembly language). In a specific example, the third-party application 1940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1940 can invoke the API calls 1950 provided by the operating system 1912 to facilitate functionality described herein.

Processing Components

Figure 20:
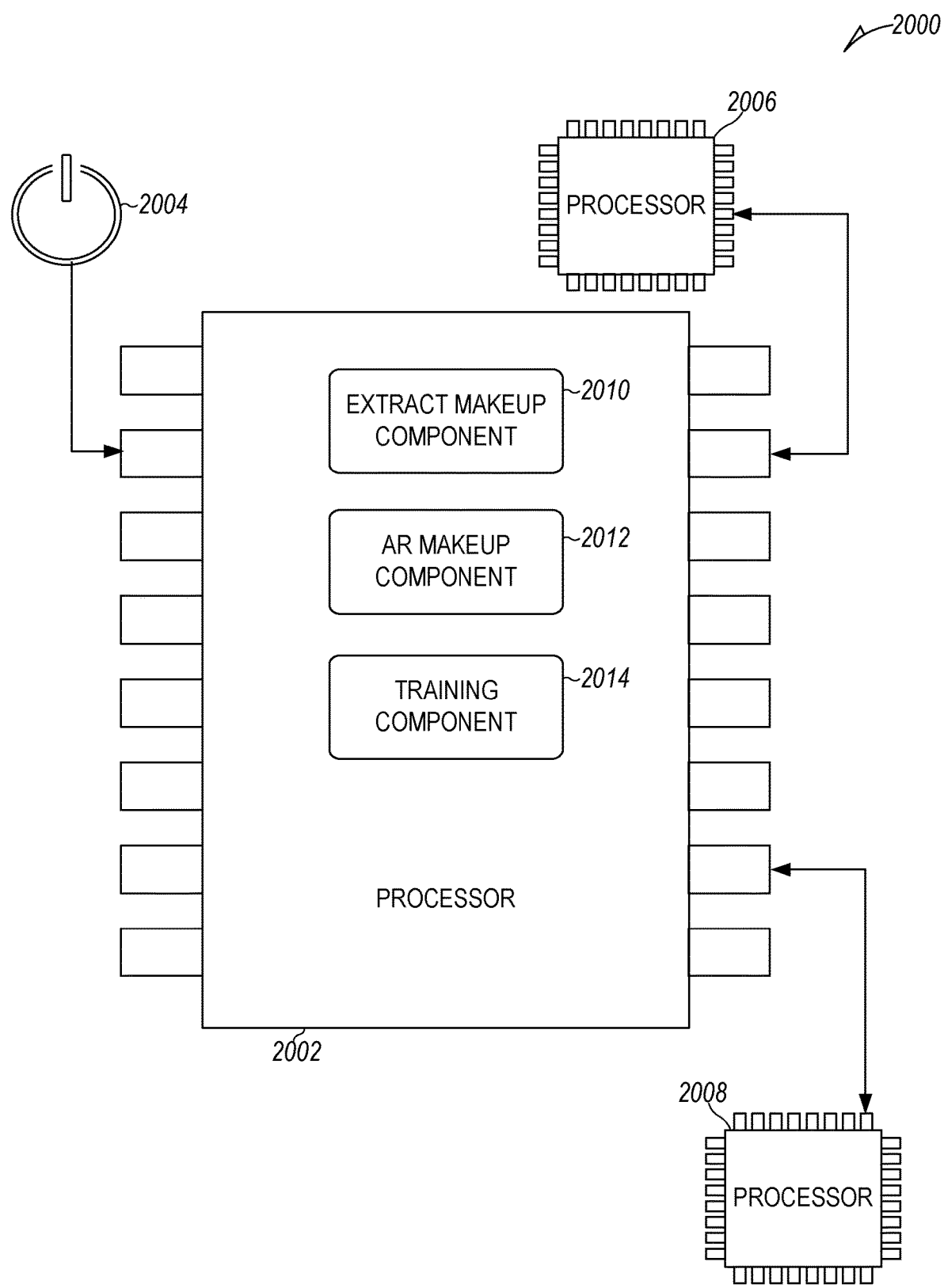
FIG. 20 is a diagrammatic representation of a processing environment, in accordance with some examples.

Turning now to FIG. 20, there is shown a diagrammatic representation of a processing environment 2000, which includes a processor 2002, a processor 2006, and a processor 2008 (e.g., a GPU, CPU or combination thereof). The processor 2002 is shown to be coupled to a power source 2004, and to include (either permanently configured or temporarily instantiated) modules, namely an extract makeup component 2010, an AR makeup component 2012, and a training component 2014. Referring to FIG. 9, the extract makeup component 2010 operationally generates processed extracted makeup images 908, which may be stored in AR makeup table 318. Referring to FIG. 6, the AR makeup component 2012 operationally generates live image with AR makeup 806, which may be displayed on a display of a device communicated coupled to the processor 2002 such as user output components 1824. Referring to FIGS. 10 and 15 the training component 2014 operationally generates weights 1012 and weights 1504 by training extract makeup component 2010 and AR makeup component 2012, respectively. As illustrated, the processor 2002 is communicatively coupled to both the processor 2006 and the processor 2008.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1802 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A system comprising:
    at least one processor; and
    a memory including instructions that, when executed by the processor, cause the at least one processor to perform operations comprising:
    processing, using a first neural network, a first image of a first person with makeup to extract a makeup portion of the first image, the makeup portion representing the makeup applied to the first person of the first image, wherein the first neural network is trained to segment images into makeup portions and not makeup portions using training data of pairs of images of a person with makeup and a same person without makeup;
    receiving input that indicates a selection to add the extracted makeup to a second image of a second person; and
    processing the second image with a second neural network to add the extracted makeup to the second person in the second image, wherein the makeup portion of the first image is input to the second neural network.

2. The system of claim 1 wherein the operations further comprise:
    causing the second image with the makeup to be displayed on a display of the system.

3. The system of claim 2 wherein the second image is a live image of a user of the system.

4. The system of claim 1 wherein the system is a mobile user device.

5. The system of claim 1 wherein the operations further comprise:
accessing a first image of a first person with makeup.

6. The system of claim 1 wherein the to add the extracted makeup to the second image comprises:
adding augmented reality (AR) graphics of the extracted makeup to the second image.

7. The system of claim 1 wherein the operations further comprise:
training the second neural network to process images of people to add augmented reality (AR) makeup representing the extracted makeup from the first image, wherein the training is based on comparing the images of people with the makeup with the makeup portion of the first image.

8. The system of claim 1 wherein the operations further comprise:
receiving the first neural network and the second neural network from a second system.

9. The system of claim 1, wherein the first neural network comprises a plurality of maximum pooling operations and then a plurality of up-convolution operations and copy operations, wherein a copy operation of the copy operations appends results from a previous layer of the neural network with the results of an up-convolution operation.

10. The system of claim 9, wherein the first neural network further comprises a fully-connected last layer that indicates segments of the first image as being the makeup portion or the not makeup portion.

11. The system of claim 1 wherein the operations further comprise:
training the second neural network to process images of people to add the extracted makeup from the first image, wherein the training is based on comparing images of people with the makeup to images of people without the makeup.

12. The system of claim 1 wherein the operations further comprise:
causing to be displayed on a display images of people with the makeup, the images comprising the first image; and
receiving a selection of the first image, wherein processing the first image further comprises:
in response to receiving the selection of the first image, processing the first image, using at least one processor, to extract the makeup portion of the first image, the makeup portion representing the makeup from the first image.

13. A method, comprising:
processing, using a first neural network, a first image of a first person with makeup to extract a makeup portion of the first image, the makeup portion representing the makeup applied to the first person of the first image, wherein the first neural network is trained to segment images into makeup portions and not makeup portions using training data of pairs of images of a person with makeup and a same person without makeup;
receiving input that indicates a selection to add the extracted makeup to a second image of a second person; and
processing the second image with a second neural network to add the extracted makeup to the second person in the second image, wherein the makeup portion of the first image is input to the second neural network.

14. The method of claim 13 further comprising:
causing the second image with the makeup to be displayed on a display of a computing system.

15. The method of claim 14 wherein the second image is a live image of a user of the system and the system is a mobile user device.

16. The method of claim 13 further comprising:
accessing a first image of a first person with makeup.

17. A non-transitory computer-readable medium comprising instructions, which when executed by a computing device comprising one or more processors, cause the one or more processors to;
processing, using a first neural network, a first image of a first person with makeup to extract a makeup portion of the first image, the makeup portion representing the makeup applied to the first person of the first image, wherein the first neural network is trained to segment images into makeup portions and not makeup portions using training data of pairs of images of a person with makeup and a same person without makeup;
receiving input that indicates a selection to add the extracted makeup to a second image of a second person; and
processing the second image with a second neural network to add the extracted makeup to the second person in the second image, wherein the makeup portion of the first image is input to the second neural network.

18. The non-transitory computer-readable medium of claim 17 wherein the instructions further cause the one or more processors to:
training the second neural network to process images of people to add augmented reality (AR) makeup representing the extracted makeup from the first image, wherein the training is based on comparing the images of people with the makeup with the makeup portion of the first image.

19. The non-transitory computer-readable medium of claim 17 wherein the instructions further cause the one or more processors to:
receiving the first neural network and the second neural network from a second system.

* * * * *